United States Patent
Zhang et al.

(10) Patent No.: US 8,095,477 B2
(45) Date of Patent: Jan. 10, 2012

(54) LOAD FUZZY MODELING DEVICE AND METHOD FOR POWER SYSTEM

(75) Inventors: Hua-Guang Zhang, Shenyang (CN); Qiu-Ye Sun, Shenyang (CN); Dong-Sheng Yang, Shenyang (CN); Zhan-Shan Wang, Shenyang (CN); Tie-Yan Zhang, Shenyang (CN); Zhi-Shan Liang, Shenyang (CN); Hong Xin, Shenyang (CN); Wu-Qi Song, Shenyang (CN); Yun-Shuang Wang, Shenyang (CN)

(73) Assignee: Northeastern University, Liaoning Province (CN)

( * ) Notice: Subject to any disclaimer, the term of this patent is extended or adjusted under 35 U.S.C. 154(b) by 653 days.

(21) Appl. No.: 12/327,804

(22) Filed: Dec. 3, 2008

(65) Prior Publication Data
US 2009/0192953 A1 Jul. 30, 2009

(30) Foreign Application Priority Data
Jan. 24, 2008 (CN) .......................... 2008 1 0010215

(51) Int. Cl.
*G06G 7/00* (2006.01)
*G06F 15/18* (2006.01)
(52) U.S. Cl. ..................................... 706/3; 706/4; 706/1
(58) Field of Classification Search .................. None
See application file for complete search history.

(56) References Cited

U.S. PATENT DOCUMENTS
2006/0025944 A1* 2/2006 Payack ............................ 702/66

OTHER PUBLICATIONS

Qiuye et al., S., "Fuzzy Modeling Method and Device for Distributed Generation System", 2009 International Conference on Measuring Technology and Mechatronics Automation, pp. 1-4, 2009.*

* cited by examiner

*Primary Examiner* — Jeffrey A Gaffin
*Assistant Examiner* — Adrian Kennedy

(57) ABSTRACT

A load fuzzy modeling device for the power system based on the causality diagram, the composite cloud generator and the improved T-S fuzzy model, comprising: a hardware device, including: the sensors, a signal conditioning and filter module, an A/D conversion module, a causality conversion module, a DSP module, a memory module, a display and keyboard module connected with the DSP module, respectively and a communication module connected with the PC. The voltage and the current are respectively acquired from the system through a voltage transformer and a current transformer, and then are transmitted into the filter circuit for filtering, thus are amplified through a amplifier LM258P as the voltage within the range of −5V ~+5V so as to input into the A/D conversion modules for sampling; the digital signal is simply processed by the causality conversion module according to certain analysis algorithm principle, and the processed signal is transmitted into the DSP to process, the final results thus displayed on the LCD screen and transmitted into the PC through the commutation module.

5 Claims, 28 Drawing Sheets

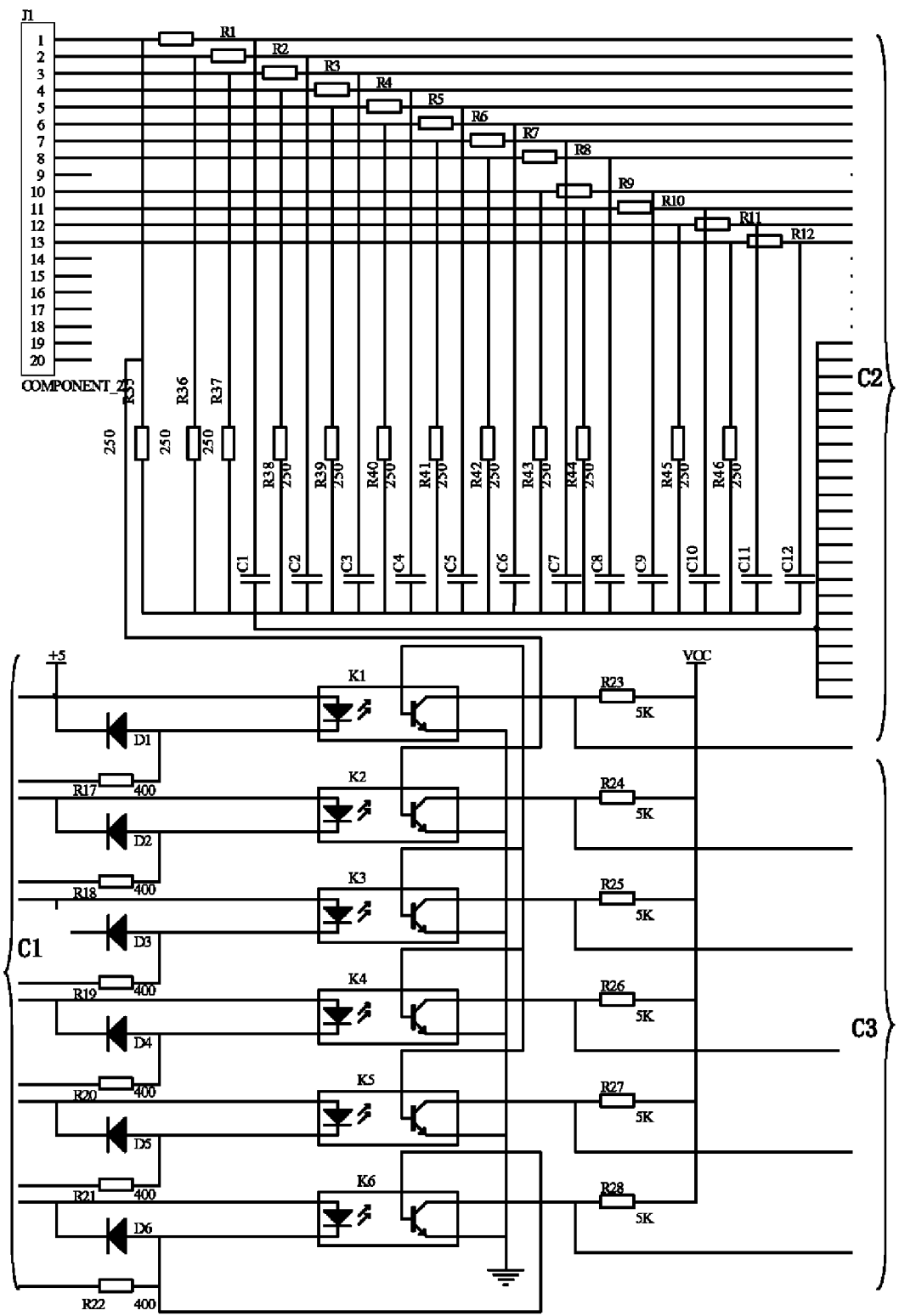
FIG. 2(cont'd-I)

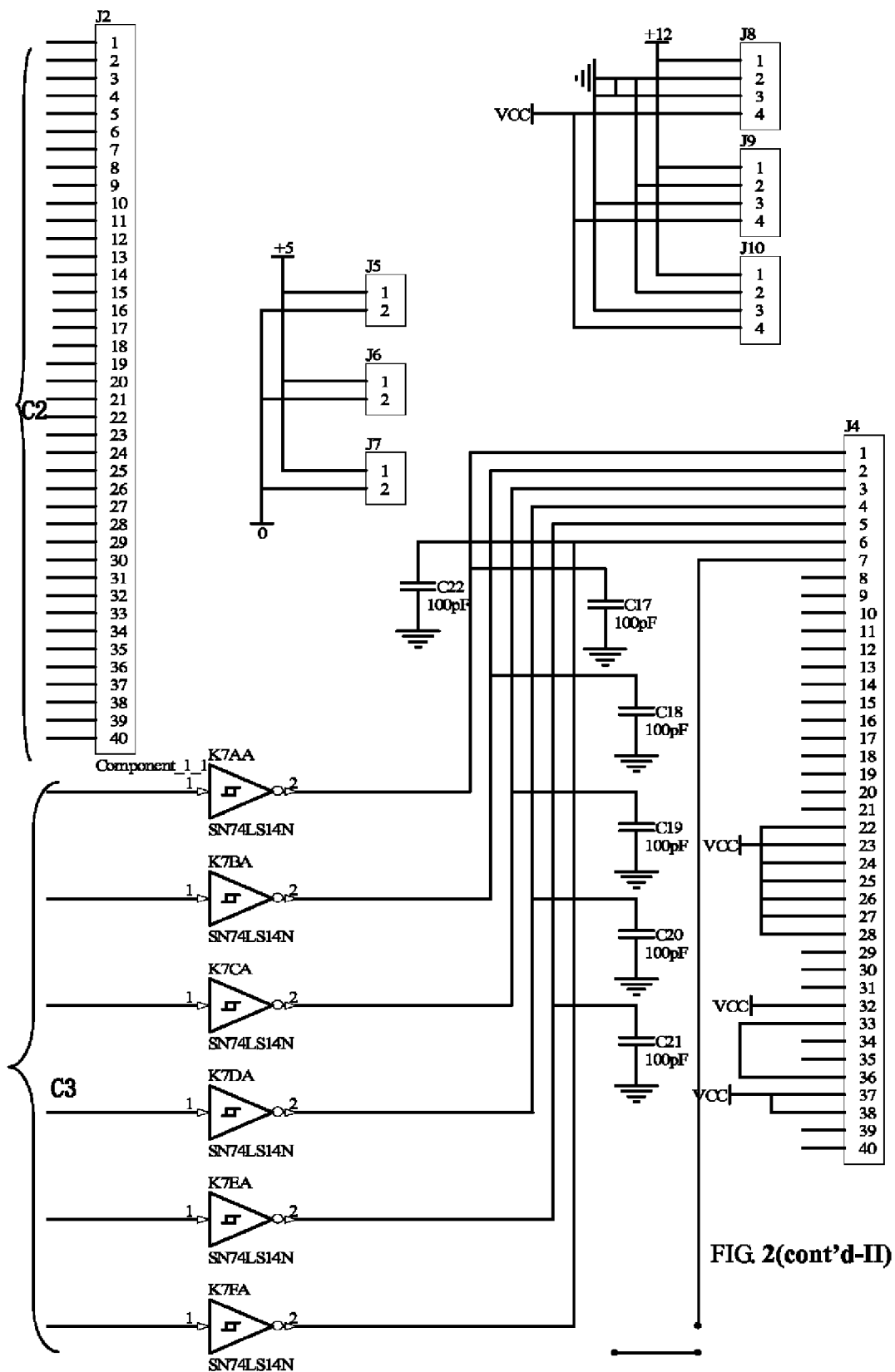
FIG. 2(cont'd-II)

LOAD FUZZY MODELING DEVICE AND METHOD FOR POWER SYSTEM

BACKGROUND OF THE INVENTION

1. Field of the Invention

The present invention relates to a load fuzzy modeling device and method for a power system.

2. The Prior Arts

Since the distribution system data contain a lot of uncertain information, a cloud model is formed on the basis of the random theory and the fuzzy theory penetrating into each other, so as to implement the conversion between the qualitative concepts and quantitative representation thereof, and thus reveals the fuzziness and the randomness of internal relevancy. Therefore, the cloud model is built to generate the failure data, in a certain extent, which can solve the problem in acquiring the failure data from the power system.

The positive cloud generator described by the language values is a converter model which represents the uncertainty between a certain basic concept and a numerical representation thereof, and also is the mapping from the qualitative to the quantitative.

The basic idea of the fuzzy method is that: firstly, the measured values become to be the fuzzy quantities through the fuzzification; then, the output fuzzy quantities are obtained through the fuzzy reasoning; finally, the confirmed output fuzzy quantities are obtained through the certainty. Since the fuzzy method seldom depends on the system model, it can be applied to many nonlinear systems.

In the T-S fuzzy model, the consequence of the fuzzy rules is similar to normal, and the antecedent is not a simple fuzzy language value, but the linear combination of the input variables, which can be regarded as the extension of the piecewise linearization, and can be used to describe a type of very extensive dynamic nonlinear system. Such a fuzzy system approaches to the nonlinear continuous functions.

SUMMARY OF THE INVENTION

The present invention provides a load fuzzy modeling device based on the composite cloud generator and the improved T-S fuzzy model, a method for modeling with that load fuzzy modeling device.

The Composite Cloud Generator:

The positive cloud generator is a transformation model which represents the uncertainty between a certain basic concept and a numerical representation thereof, and can also map from the qualitative to the quantitative. According to the numerical characteristic of the cloud, the positive cloud generator produces cloud droplets which will be accumulated and then a certain amount of the clouds are formed. By means of the positive cloud generator, the range and the regularities of distribution of the quantitative data are required from the qualitative information represented by the language values, the input of which is the expectation $E_x$, entropy $E_n$ and the super entropy $H_e$, and the number of the cloud droplets N, the output of which is the quantitative position of the N cloud droplets in the numeric field, and also the certainty of such quantitative position represented by every cloud droplets. Thousands of cloud droplets which are generated by the cloud generator constitute the whole cloud.

The reverse cloud generator is a converter model which represents the uncertainty between the conversion between a numerical value and a language value thereof, and also is the mapping from the quantitative to the qualitative. It is used to effectively convert a certain amount of accurate data into the concepts represented by the appropriate qualitative language values of $E_x$, $E_n$ and $H_e$, hereby, represent the whole cloud droplets which are reflected by these accurate data. The more accurate data correspond to the cloud droplets, the more precise the concept is.

The Improved T-S Fuzzy Model:

The basic idea of the fuzzy method is: transferring the measured values into the fuzzy quantities through the Fuzzification, then obtaining the output fuzzy quantities through the fuzzy reasoning, finally, obtaining the confirmed output fuzzy quantities through the certainty. Since the fuzzy method seldom depends on the system model, it applies to many nonlinear systems.

In the T-S fuzzy model, the consequence of the fuzzy rules is similar to normal, and the antecedent is not a simple fuzzy language value, but the linear combination of the input variables, which can be regarded as the extension of the piecewise linearization, and can be used to describe and represent a type of extremely extensive dynamic nonlinear system. Such a fuzzy system has the capability of approximating to the nonlinear continuous functions.

According to the present invention, the cloud theory can be applied to the power system. The specific distribution of the observed objects can be effectively restored through the combination of the positive cloud generator and the reverse cloud generator. In the case the cloud droplets of the observed objects are all congregated around several points, each of the cloud droplets is subjected to the fuzzy clustering for differentiating space, and thus the target data are restored. A new composite cloud data generator with a feedback is applied to solve the problem of the data centre-of-gravity shift under the condition of less data.

Since there is a common problem of less basic data in the practical application, the numerical characteristic errors of the cloud obtained from the positive cloud generator are a bit large. Due to the cloud droplets are generated by the positive cloud generator one-by-one, each of which generated means the increasing of the initial basic data, and with the increasing of the basic data, the generated concept is also consequentially more definite, we can realizes this function through a closed-loop structure. Amongst the generated cloud droplets, it is necessary to consider that the situation may not be occurred or not be allowed in the engineering application, for this, adding constraint equation set into the positive cloud generator which can realizes the limitation. And the application data is also considered to be compensated under the extreme condition.

According to the present invention, the tasks should be performed including: transmitting the induced voltage/current signal into a filter circuit by a sensor and then processed in the proper proportion within the range of amplitude that can be processed through a signal-dealing module; converting the processed signal into the digital signal that can be identified through an A/D conversion module and then first simply processed through a causality conversion module; analyzing the signal by a DSP module for a load modeling; thus, displaying the model parameters on the LCD screen. Herein, a keyboard is used to input various related parameters into the system and a communication model is used to transmit the identification results into the upper device.

In this present invention, the load fuzzy model is obtained by using the method for modeling with the improved T-S fuzzy model according to the characteristics of the fuzzy modeling. FIG. 12 illustrates the composite cloud generator, and FIG. 13 illustrates the steps for the processing of the composite cloud generator. FIG. 14 illustrates the steps for identifying the fuzzy model.

The Hardware Configuration:

This present invention provides a hardware device including the upper and lower devices. The upper and lower devices are consisted of the sensors, a signal conditioning and filter module, an A/D conversion module, a causality conversion module, a DSP module, a memory module, a display and keyboard module and a communication module, wherein the DSP module is respectively connected with the sensors, the signal conditioning and filter module, the A/D conversion module, the causality conversion module, the DSP module, the memory module, the display and keyboard module and the communication module, and the upper device is connected with the commutation module, as shown in FIG. 1.

The voltage and the current are respectively acquired through a voltage transformer and a current transformer, and are inputted into the voltage and current signal conditioning circuits through the filter circuit, as shown in FIG. 3. PT204A is selected as the voltage transformer, and CT254A as the current transformer. The signals transferred by the voltage and current transformers are transmitted into the filter circuit (as shown in FIG. 2) for filtering, then pass through a amplifier LM258P for tuning the voltage in a range of −5V~+5V, and are inputted into the DSP modules for sampling. J3 is connected with the current transformer and the voltage transformer, and J4 is connected with the A/D conversion module. The high-voltage part of the circuit can also be isolated from the system for protection.

As shown in FIG. 4, the chip MAX125 is selected as an A/D conversion module. The channels of the pins 1, 2, 3, 4, 33, 34 are applied to achieve the output signals from the port J4, and the data ports thereof are directly connected with the data ports of the causality conversion chip. The three-phase voltage and current from the signal conditioning module are sampled as the basic data for the system calculation.

As shown in FIG. 5, the chip EMP7128 is selected as a causality conversion module, which is formed by the CMOS technique, based on the second generation matrix structure, and is a device basing on the $E^2$PROM. EMP7128SLC84-15 has 84 pins wherein 5 pins are applied for the ISP (In System Programmable) downloading and can be programmed easily. The device includes 6000 integrated gates with 2,500 typically available gates, 128 logic elements, 60 I/Os respectively configured as the input, output and two-way mode, 2 global clocks, one global enable terminal and one global clear terminal. These gate circuits can be programmed by software Max+Plus II. EMP7128SLC84-15 supports the multi-voltage operation with the transmission delay of 7.5 ns and the highest frequency of 125 MHZ, and also supports various programming methods. Thereby, it is convenient for the third generation software Max+Plus II of the Alter company to simulate, synthesize and download. The input port thereof is connected with the data port of the A/D conversion, and thus the output signal is directly inputted into the data port of the DSP.

As shown in FIG. 6, the chip X5043 is selected as the memory module, and the pins 4, 3, 2, 1 thereof are connected with the pins 28, 29, 32, 33 of the DSP chip, respectively. The voltage of each phase, the current, the active power and the power factor on the hour during a period of 64 days are also stored in the data memory in addition to the various parameters settled by the memory system; The back-up battery of the memory ensures that the data will not be lost when the power supplies are insufficient.

As shown in FIG. 7, chip TL7705A is selected as the reset circuit of the DSP chip, and the pin 5 thereof is connected with the pin reset.

As shown in FIG. 8, the display and keyboard modules are applied to several man-machine dialog operations. For example, the user can set the parameters of the device, and monitor the operation condition of the device. Such function in the hardware design is realized by setting the keys.

As shown in FIG. 9, the communication module further includes the function of communicating with the higher-level module for the requirements on the unattended operation and the comprehensive automatic station. The serial port thereof only provides the hardware structure and basic communication operation for the mutual channel. The Protocol RS232 is used as the computer serial interface. The pins 11, 12 of MAX232 are connected with the pins 25, 26 of the DSP chip. Socket 232 is connected with the PC serial port through the cable 232. In addition, the system clock circuit is shown in FIG. 10.

The Software Configuration:

The steps for realizing the causality conversion are shown in FIG. 11.

The construction algorithm of the causality diagram can be realized through the initial knowledge base named as Y, wherein Y={<x,cj>}, x=($a_1$, $a_2$, . . . , $a_n$) represents one example of the initial knowledge base, which has n-attributes listed in the attribute list ($A_1$, $A_2$, . . . , $A_n$) respectively, where $a_i$ is the values of the attribute $A_i$. $C_j \epsilon C=\{C_1, C_2, \ldots, C_m\}$ is the results of the classification.

The Software for Realizing the Cloud Model

FIG. 12 shows that when the coordinate distribution of the two-dimensional data is inputted, the distribution of these cloud droplets in various fuzzy intervals is obtained through the fuzzy intervals partitioned. Then, the numerical characteristics of the cloud in various corresponding fuzzy intervals are obtained through the reverse cloud generator, and then the corresponding cloud droplets are generated according to the numerical characteristics. Thus, the generated cloud droplets are added into the initial intervals partitioned so as to modify the numerical characteristics of the cloud of the fuzzy interval.

As shown, i=1, . . . , n, n represents all the basic data of the universe, k=1, . . . , l, l represents the subsection information, ki=1, . . . , $n_k$, $n_k$ represents the number of the cloud droplets in every fuzzy intervals. Where, the fuzzy intervals partitioned uses the improved T-S fuzzy model identification method; The constraint equations are specific operating mode, which are the maximum carrying capacity of the power system and the starting threshold of the system relay protection device described in the present invention, as shown in (1)

$$\begin{cases} \sum_{B_m \in U} (\tilde{P}_m^2 + \tilde{Q}_m^2) < S_{max}^2 \\ \sup_{B_m \in U} \{\dot{I}_m\} < \dot{I}_{f.max} \\ \sup_{N_v \in U} \{\dot{U}_v\} > \dot{U}_{N.max} \text{ or } \inf_{N_v \in U} \{\dot{U}_v\} < \dot{U}_{f.max} \end{cases} \quad (1)$$

Wherein, U represents the universe of the power system including network nodes and branches. U={$B_m$,$N_v$; m=1, . . . , M; v=1, . . . , V}, where $B_m$ represents the branches collection, M represents the number of the branches, $N_v$ represents the nodes collection, V represents the number of the nodes, $S_{max}^2$ represents the maximum carrying capacity, and $\dot{I}_{f.max}$ and $\dot{U}_{f.max}$ represent the starting thresholds of the voltage and the current of the relay protection device, respectively.

The supplementary operating mode data is mainly used in the situation where the data is difficult to be appeared during the normal measurement process. In the power system, while the line fault is occurred, there are the load rejections of partial circuit in the system; and while the stepout is occurred, the large area system is restored or there is black-Start in the system. The load of the system quickly reduced into 0 in normal or quickly goes into the normal load section in 0, as shown in (2)

$$\begin{cases} \{P_m, Q_m\} = F_{\{P_m, Q_m\}}(\dot{U}_v, t) \\ \mu_i = k_1 P_{m,i}; \dot{U}_{l_1 b} < \dot{U}_{i,v} < \dot{U}_{l_1 c} \\ \mu_i = k_2 P_{m,i}; \dot{U}_{l_2 b} < \dot{U}_{i,v} < \dot{U}_{l_2 c} \end{cases} \quad (2)$$

Wherein, $F(\dot{U}_v,t)$ represents a function of the voltage and the time according to the active-power and the reactive-power, $\mu_i$ represents the membership grade of the generated supplementary cloud droplets, and $(l_{1b}, l_{1c}),(l_{2b},l_{2c})$ represents the endpoints of the interval 1 for the membership grade of the trapezoid subordinate function of the corresponding fuzzy space, respectively. $k_1,k_2$ represents the corresponding curve slopes.

Input: Origin N groups of load data of distribution system, which are the voltage $u_{ki}$, active power $p_{ki}$ and reactive power $q_{ki}$, $\{u_{ki},p_{ki}\}$ and $\{u_{ki},q_{ki}\}$ are two kinds of two dimensions cloud drops. We explain the algorithm by active power. For convenient writing, the $\{u_i,p_i\}$ is equal to $\{u_{ki},p_{ki}\}$, n is equal to $n_k$ and the subscripts k of Ex, En and He are elided in each rough-cloud subset.

Output: N1 groups of load data generated by combination cloud generator, where N1>N.

Referring to FIG. 13, the algorithm of combination cloud generator can be illustrated.

The Detailed Steps for the T-S Model Identification:

The fuzzy identification method which is obtained input and output to/from the object dynamic model is consisted of two parts: the identification of the premise structure and the parameters identification. The parameters identification is divided into the premise parameters identification and the conclusion parameters identification. As shown in FIG. 14, the process of the fuzzy model identification and the detailed calculations of steps are following discussed, respectively.

The Conclusion Parameters Identification:

If given the premise structure and parameters of the fuzzy model, and given a set of input and output data, the optimal conclusion parameters are obtained.

$$\hat{y} = \left[\sum_{i=1}^{n} G^i(p_0^i + p_1^i x_1 + \ldots + p_m^i x_m)\right] / \sum_{i=1}^{n} G^i = H \Box \theta^T$$

Here, $$H = (W^1, W^1 x_1, \ldots, W^1 x_m, W^2,$$
$$W^2 x_1, \ldots, W^2 x_m, \ldots, W^n, W^n x_1, \ldots, W^n x_m)$$

$$\theta^T = (P_0^1, P_1^1, \ldots, P_m^1, P_0^2, P_1^2, \ldots, P_m^2, \ldots, P_0^n, P_1^n, \ldots, P_m^n)^T$$

Wherein: H is the data row vector, $\theta$ is the parameter vector to be identified, and the superscript "T" represents the transposition, $$W^j = G^j / \sum_{i=1}^{n} G^i \quad j=1,\ldots,n$$

as shown in FIG. 15, the optimal conclusion parameters are obtained to minimize mean square error by using the least-square method, steps are following:

step 1: If given L groups of input and output data (L>n*(m+1)), each group of data $(x_{1k}, x_{2k}, \ldots, x_{mk}, y_k)$ is calculated by $$H_k = (W_k^1, W_k^1 x_{1k}, \ldots, W_k^1 x_{mk}, W_k^2, W_k^2 x_{1k}, \ldots, W_k^2 x_{mk}, \ldots, W_k^n, W_k^n x_{1k}, \ldots, W_k^n x_{mk}), k=1, 2, \ldots, L$$

Here $$W_k^i = G_k^i / \sum_{i=1}^{n} G_k^i,$$

$G_k^i$ represents the group k data is brought into the equation to calculate, and the true value of the rule i is obtained.

step 2: The initial parameters are $\theta_0 = 0$, $S_0 = \alpha I$

Where, $\alpha$ is larger number, such as $10^5$; I is the unit matrix.

step 3: Calculating $$F_k = S_{k-1} H_k^T / (1 + H_k S_{k-1} H_k^T)$$

$$S_k = S_{k-1} - F_k H_k S_{k-1}$$

$$\theta_k^T = \theta_{k-1}^T + F_k(y_k - H_k \theta_{k-1}^T)$$

Here, $F_k$ is the gain vector; $S_k$ is the covariance matrix; $\theta_k$ is the parameter vector to be identified; $H_k$ is the data row vector.

Step 4: k+1→k

If k≦L, returns to step 3; Otherwise, after the iterative, $\theta_k$ namely is the required conclusion parameters.

The Premise Parameters Identification

The fuzzy identification algorithm includes three types of membership functions, which are composed of piecewise linear. They are small, medium and large, as shown in FIG. 16.

As shown in FIG. 16, $p_i$ is the premise parameter which represents the turning point of various membership functions, and the corresponding membership degrees are 0 or 1. The fuzzy subsets of large and small include 2 premise parameters to be identified, and medium includes 4 premise parameters to be identified.

The problem of the premise parameter identification is to obtain the premise parameters for minimizing the performance index, according to the given groups of input and output data. According to the identifying algorithm of the present invention, the performance index PER is the mean square of the square errors. The error herein is defined as the difference between the output of the actual system and the output of the identifier.

In the process of premise parameter identification, the following three conditions should be satisfied:

(1) Each of the premise parameters can not exceed the field of definitions corresponding to the premise variables.

(2) The division of each range of the premise variables is to maintain completeness. So-called completeness means a corresponding output value can be provided with the fuzzy model in any process conditions.

(3) The values range of each of the premise variables $x_j$ includes and only includes two types of forms.

As shown in FIG. 17 and FIG. 18, only the processes of the fuzzy space partition are shown in the figures, where the premise parameter 1 is divided into the large and the small and the premise parameter 2 is divided into the large, the medium and the small. And other cases are similar.

The Identification of the Premise Structure

The identification of the premise structure includes: determining the generalized input variables which should be appeared in the premise, then optimally partitioning the variable spaces.

The steps thereof are following:

Step 1: Identifying the general linear model, its performance index is PER (1)

Step 2: The range of $x_1$ is divided into 2 fuzzy subspaces: small and large. Other variables do not separate. The premise structure represented by 2 rules:

$R^1$: if $x_1$ is small then ....
$R^2$ if $x_1$ is large then ....

According to the above-mentioned method, the corresponding PER is obtained though identifying the conclusion parameters and the premise parameters. Likewise, the range of $x_2$ is divided for identifying the related parameters, so as to obtain PER corresponding to $x_2$. The latest performance index PER (2) and the corresponding structures STR (2) model structure are selected from m model structures. A given corresponding variable of STR (2) is $x_1$.

Step 3: The number of the fuzzy subspace in the premise is increased from 2 to 3. For each of premise structures configured in this step, the premise structure STR (3) corresponding the smallest PER (3) is selected through identifying the related parameters and calculating the PER.

Step 4: If certain condition below is satisfied, the identification process ends. Herein, the optimal structure is STR (i) and the best performance index is PER (i), and thus the premise parameters and conclusion parameters are obtained.

A: PER (i) is less than a predetermined value.
B: the rule number is equal to the predetermined value.

$$C: \left| \frac{PER(i) - PER(i-1)}{PER(i)} \right| < \varepsilon,$$

ε is a given decimal.

The foregoing and other objectives, features, aspects and advantages of the present invention will become more apparent from the following detailed description of the present invention when taken in conjunction with the accompanying drawings.

BRIEF DESCRIPTION OF THE DRAWING

The present invention will be apparent to those skilled in the art by reading the following detailed description of a preferred embodiment thereof, with reference to the attached drawings, in which.

DETAILED DESCRIPTION OF THE PREFERRED EMBODIMENT

The present invention will hereinafter be described in detail with reference to the accompanying drawings in which exemplary embodiments of the invention are shown.

Example 1

A part of 10 KV power system in the Tieling Grid is taken for example. According to the hardware circuit, 150 sets of data regarding to the peak and valley load fluctuation of the nodes in the normal and 50 sets of short-circuit fault data due to the two-phase short-circuit, three-phase short-circuit and the two-phase to-ground short circuit, etc. occurred between different nodes are collected from the power line. Through the power flow algorithm, the distributions of the active power and the reactive power and the voltage of the whole net are obtained according to 200 sets of data.

50 sets of data (30 sets of normal operation data and 20 sets of fault data) are referred as the basis data which constitute two types of basis two-dimensional data i.e. the two-dimensional data of the voltages of the nodes corresponding to the active power and the two-dimensional data of the voltages of the nodes corresponding to the reactive power. First, according to the distribution of data, the data is divided into large, medium and small fuzzy intervals as the inputs of composite cloud generator. And the data of each of fuzzy intervals is processed through the reverse cloud generator to generate the two-dimensional expectation, entropy, and super entropy, and then the cloud droplets are outputted from the cloud generator. Each of generated cloud droplets is examined by the constraint equations, which is qualified will be added into the initial fuzzy intervals, and then is inputted into reverse cloud generator again, so as to generate the two-dimensional expectation, entropy and super entropy, back and forth, until enough data is generated.

The method including: in the definition field of the voltage, small enough step length is first used to divide into two sections, and the optimal segment point is obtained by the calculation, namely the premise parameters. Then according to the same method, two divided sections are processed until the performance indexes required are qualified. The performance indexes according to the present invention are the mean square of the error square.

Figure 1:
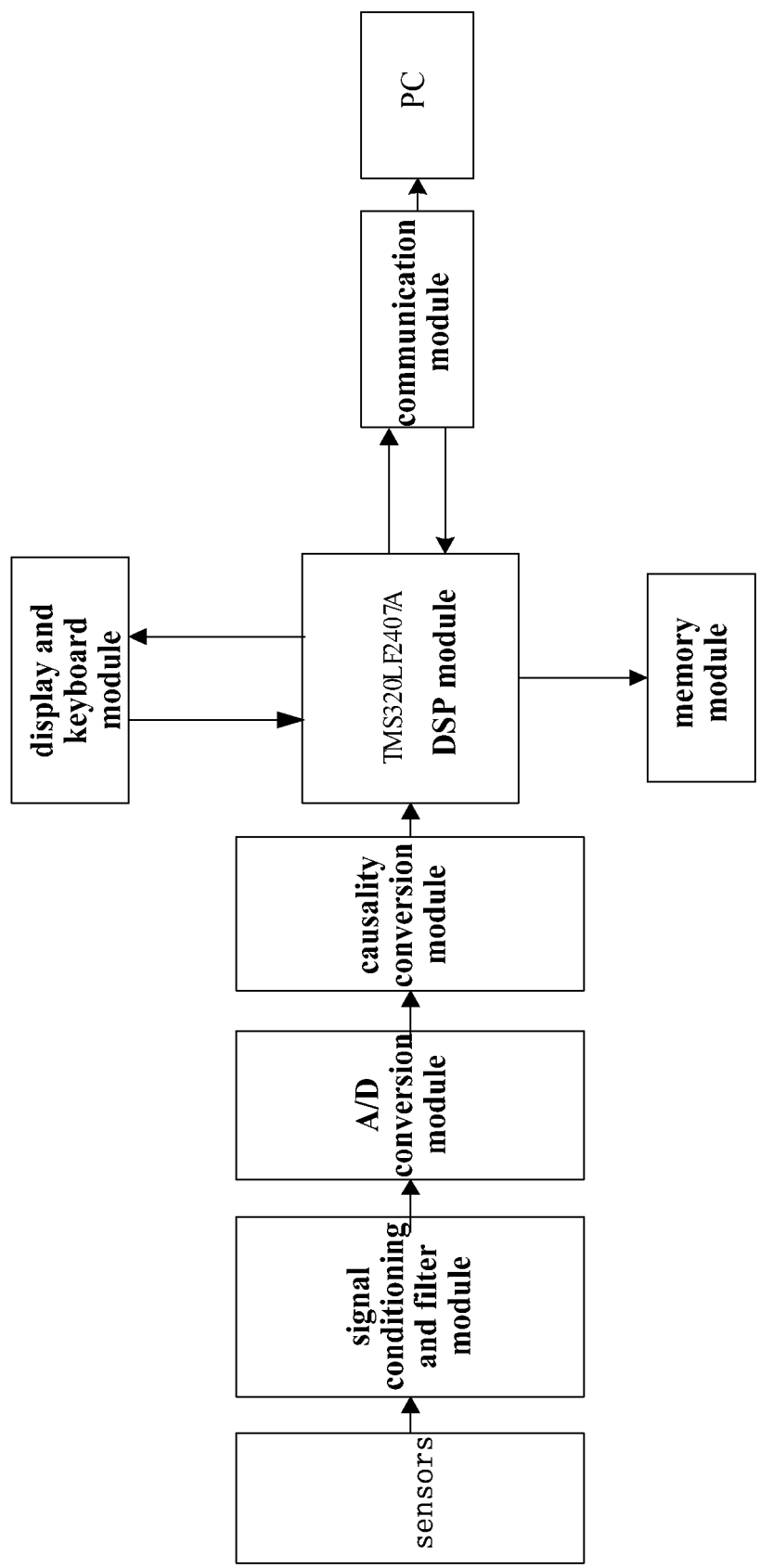
FIG. 1 is a block diagram showing the system according to the present invention.
Figure 2:
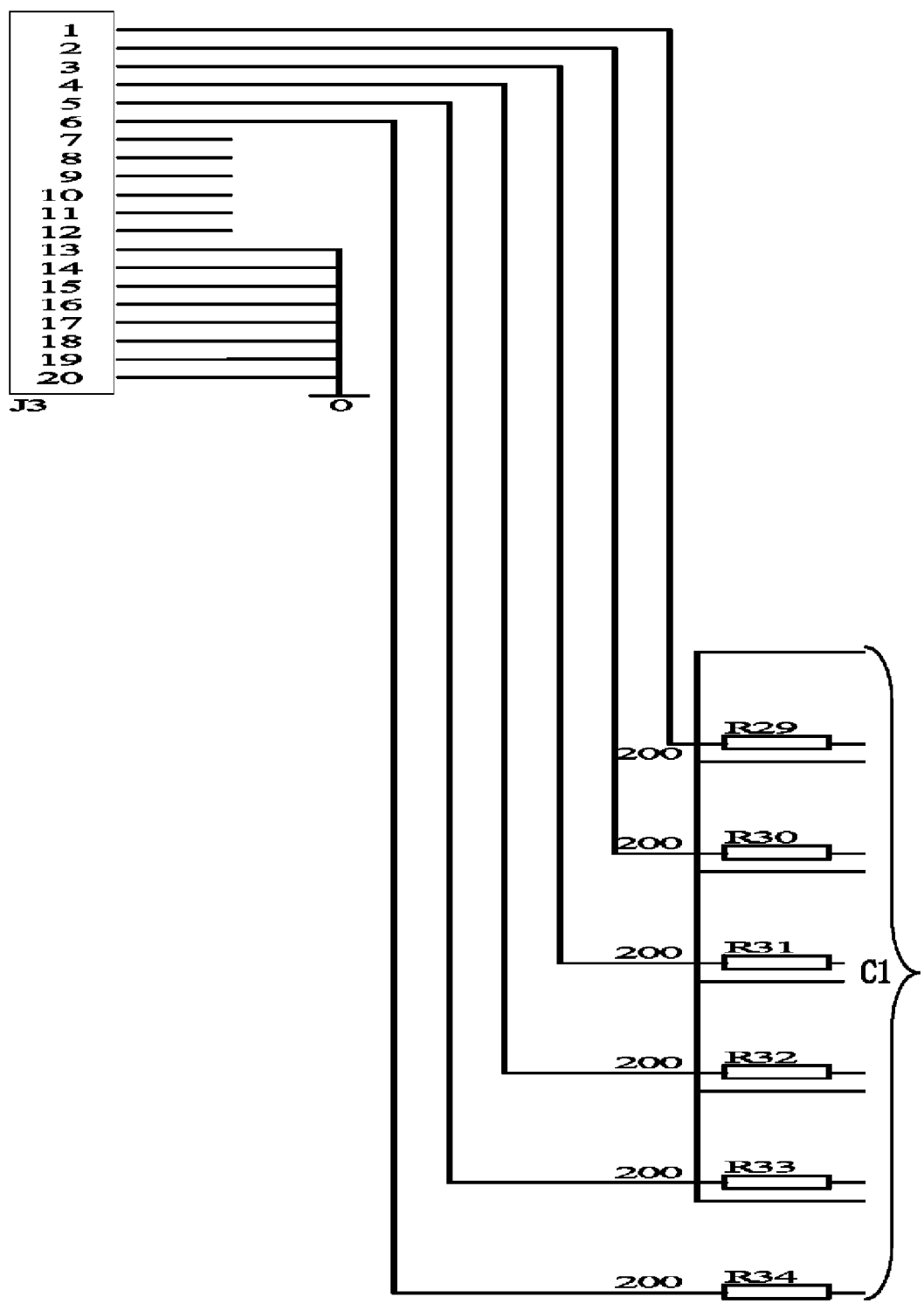
FIG. 2 is a circuit diagram showing the filter circuit in the hardware circuit according to the present invention.
Figure 3:
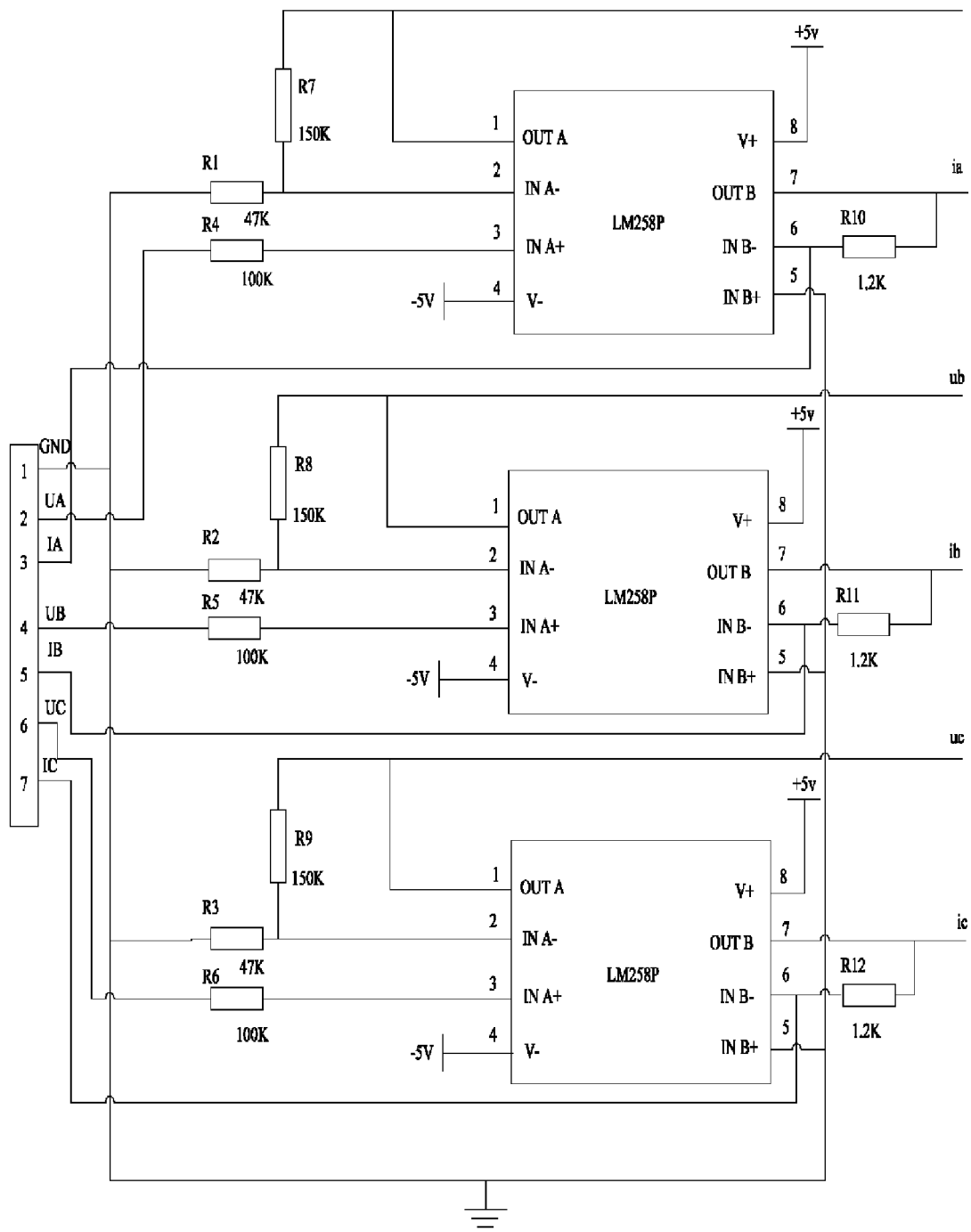
FIG. 3 is a circuit diagram showing the voltage and current signal conditioning module of the hardware circuit according to the present invention.
Figure 4:
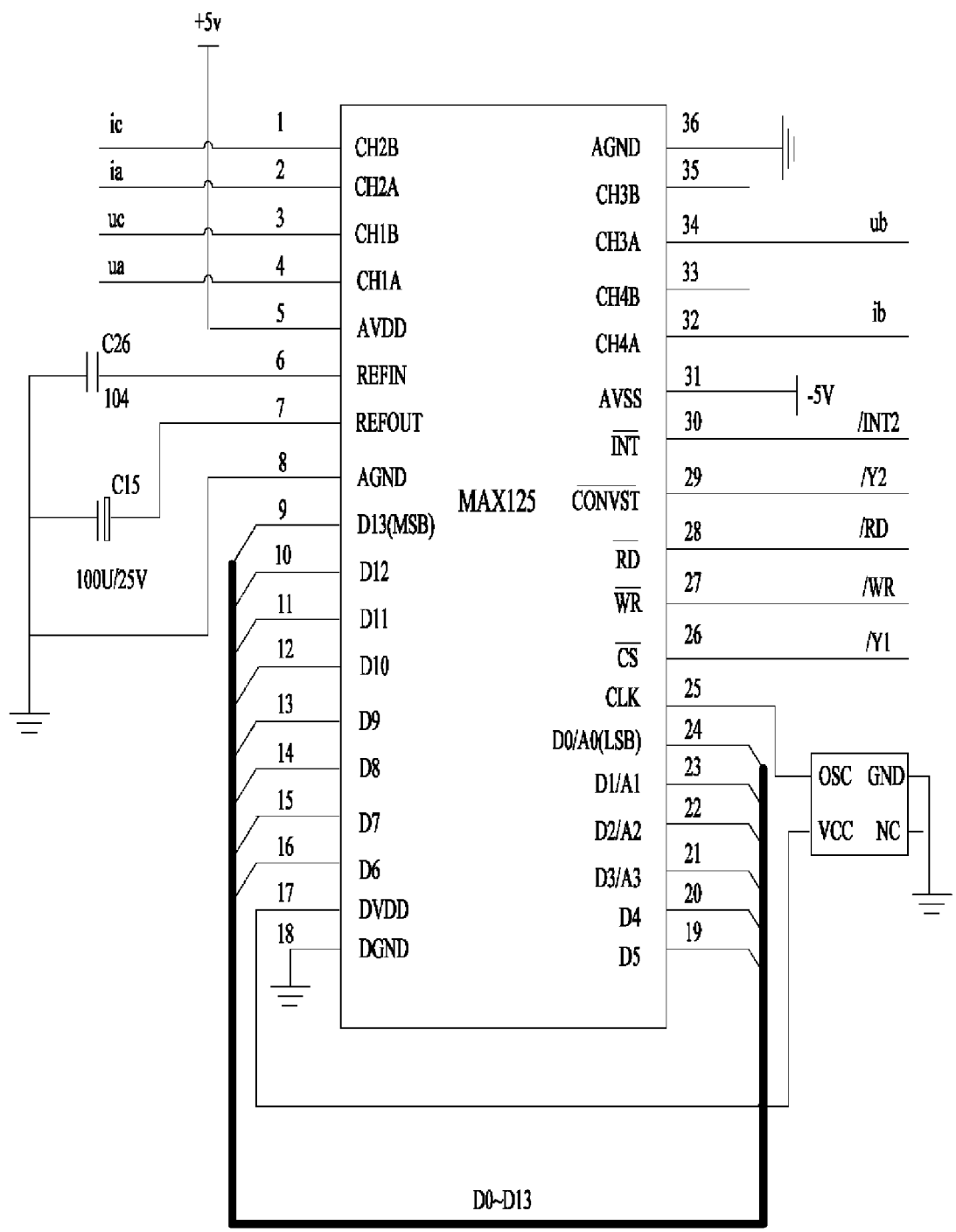
FIG. 4 is a circuit diagram showing the A/D conversion module of the hardware circuit according to the present invention.
Figure 5:
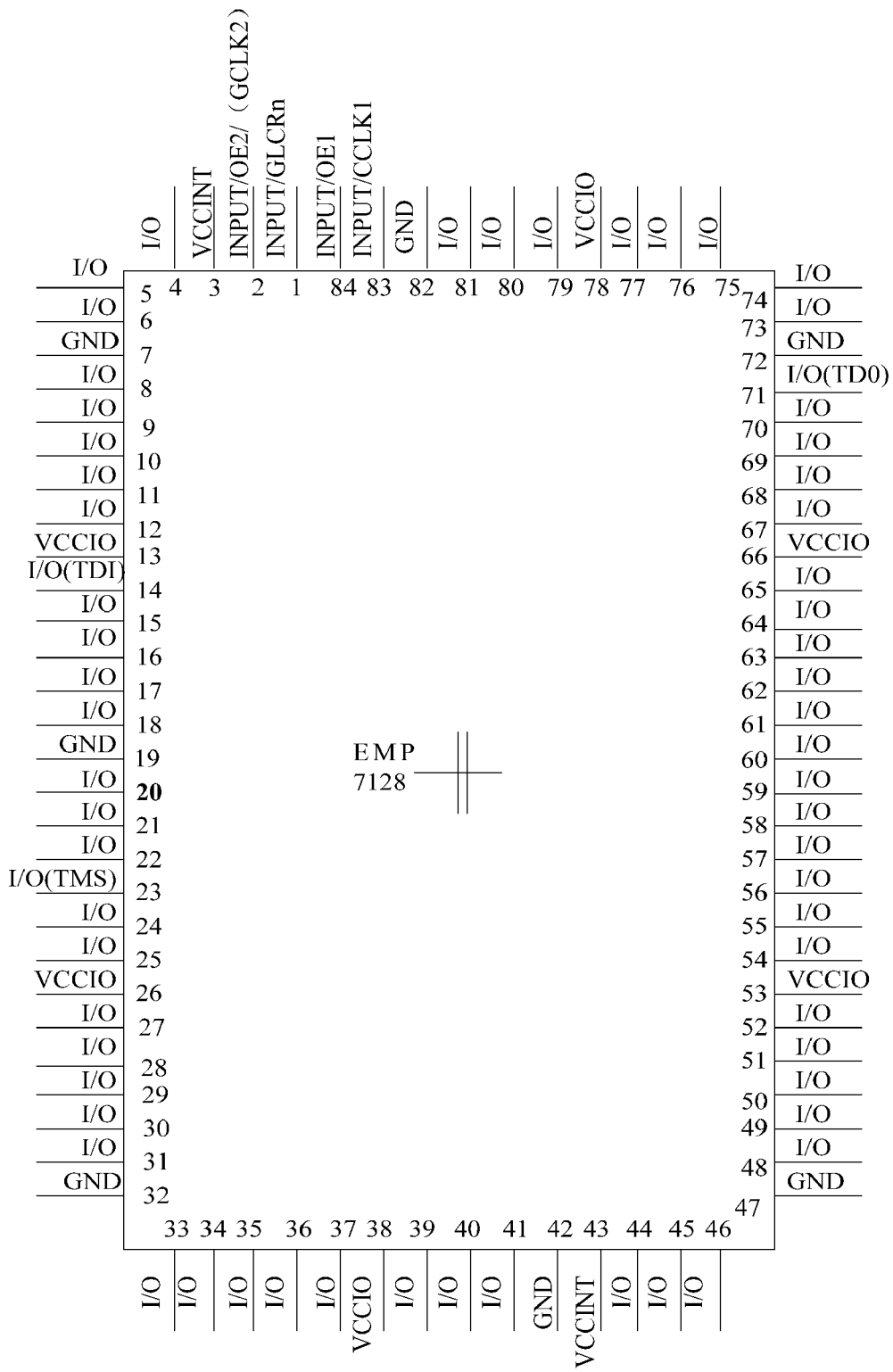
FIG. 5 is a circuit diagram showing the causality conversion module of the hardware circuit according to the present invention.
Figure 6:
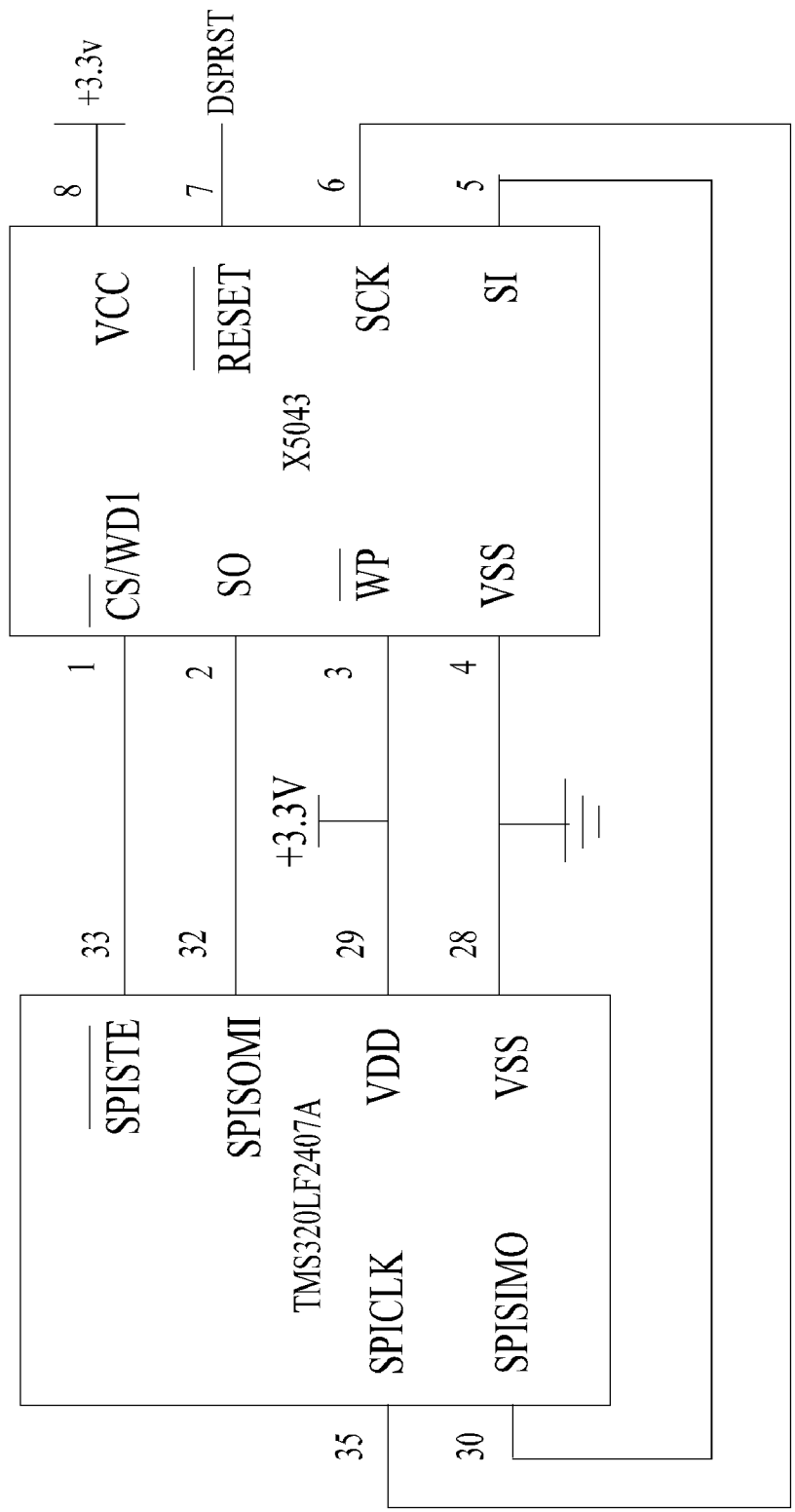
FIG. 6 is a circuit diagram showing the memory module of the hardware circuit according to the present invention.
Figure 7:
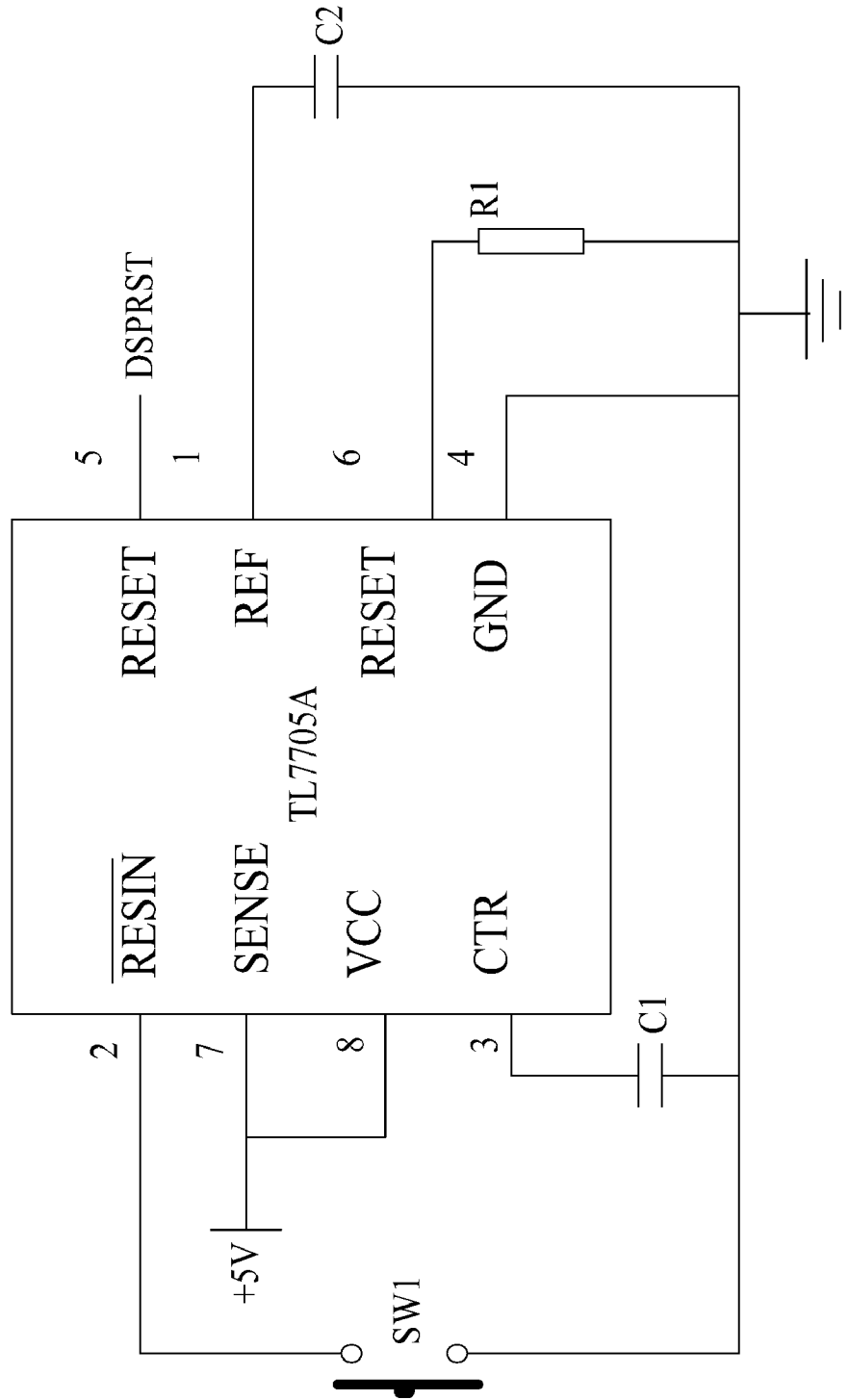
FIG. 7 is a circuit diagram showing the reset circuit of the hardware circuit according to the present invention.
Figure 8:
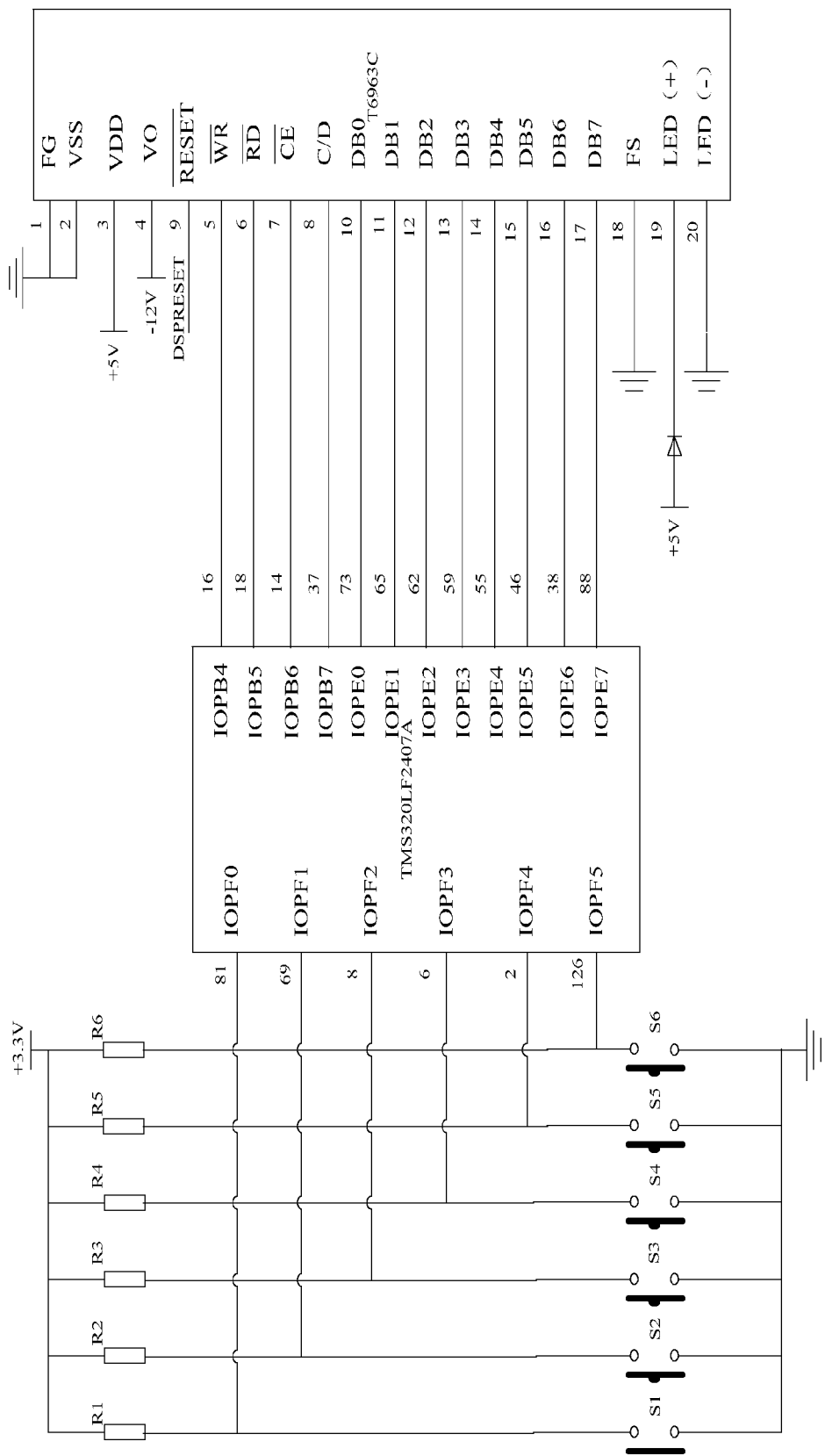
FIG. 8 is a circuit diagram showing the display and keyboard module of the hardware circuit according to the present invention.
Figure 9:
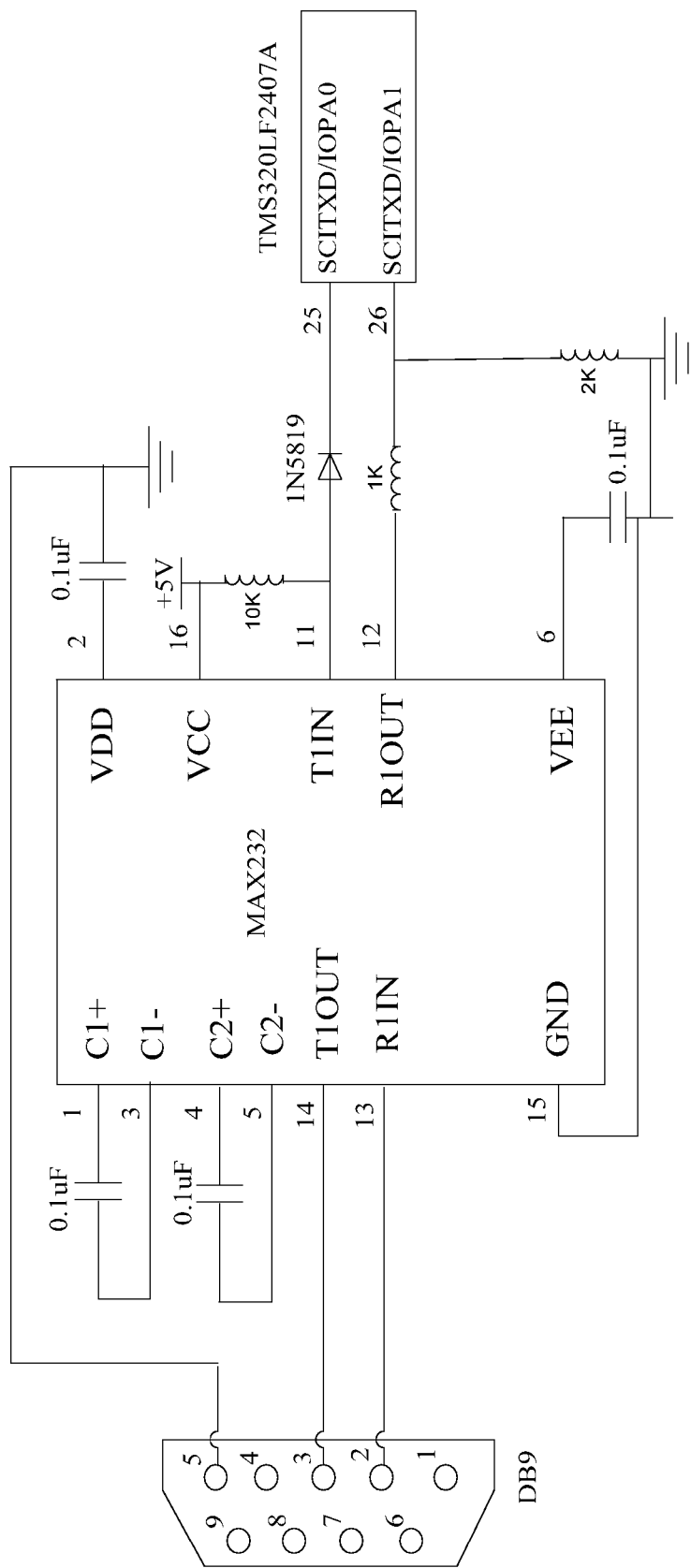
FIG. 9 is a circuit diagram showing the communication module of the hardware circuit according to the present invention.
Figure 10:
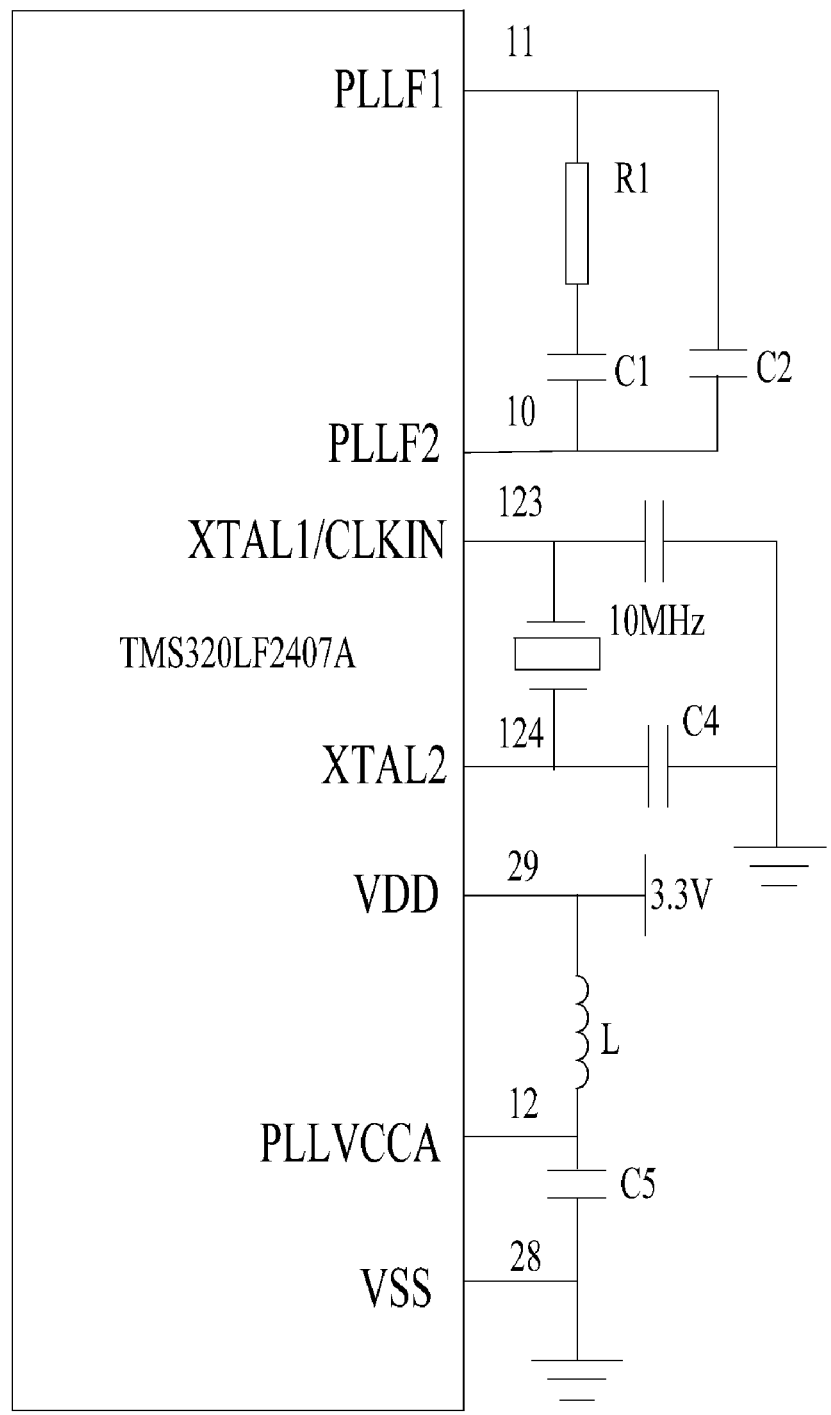
FIG. 10 is a circuit diagram showing the clock module of the hardware circuit according to the present invention.
Figure 11:
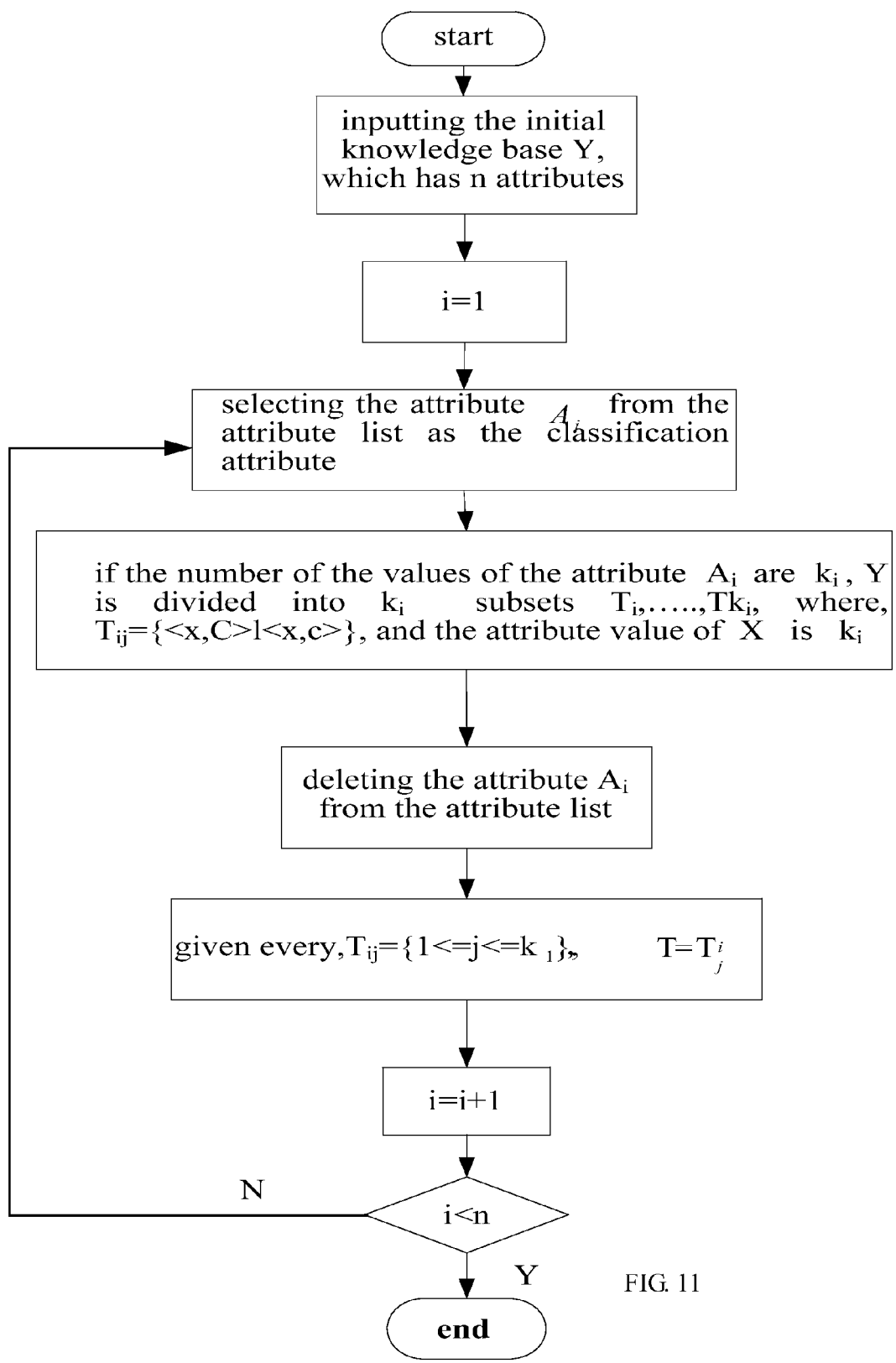
FIG. 11 is a flow chart showing the steps for realizing the causality conversion according to the present invention.
Figure 12:
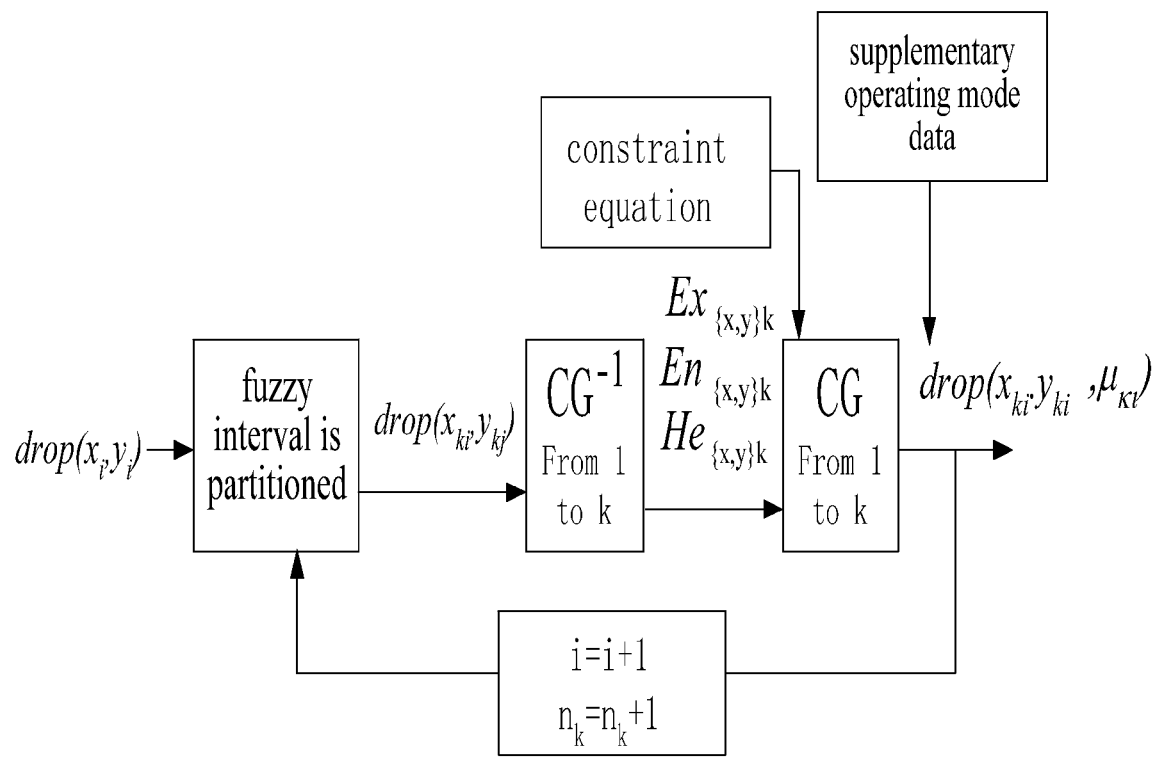
FIG. 12 is a block diagram showing the composite cloud generator according to the present invention.
Figure 13:
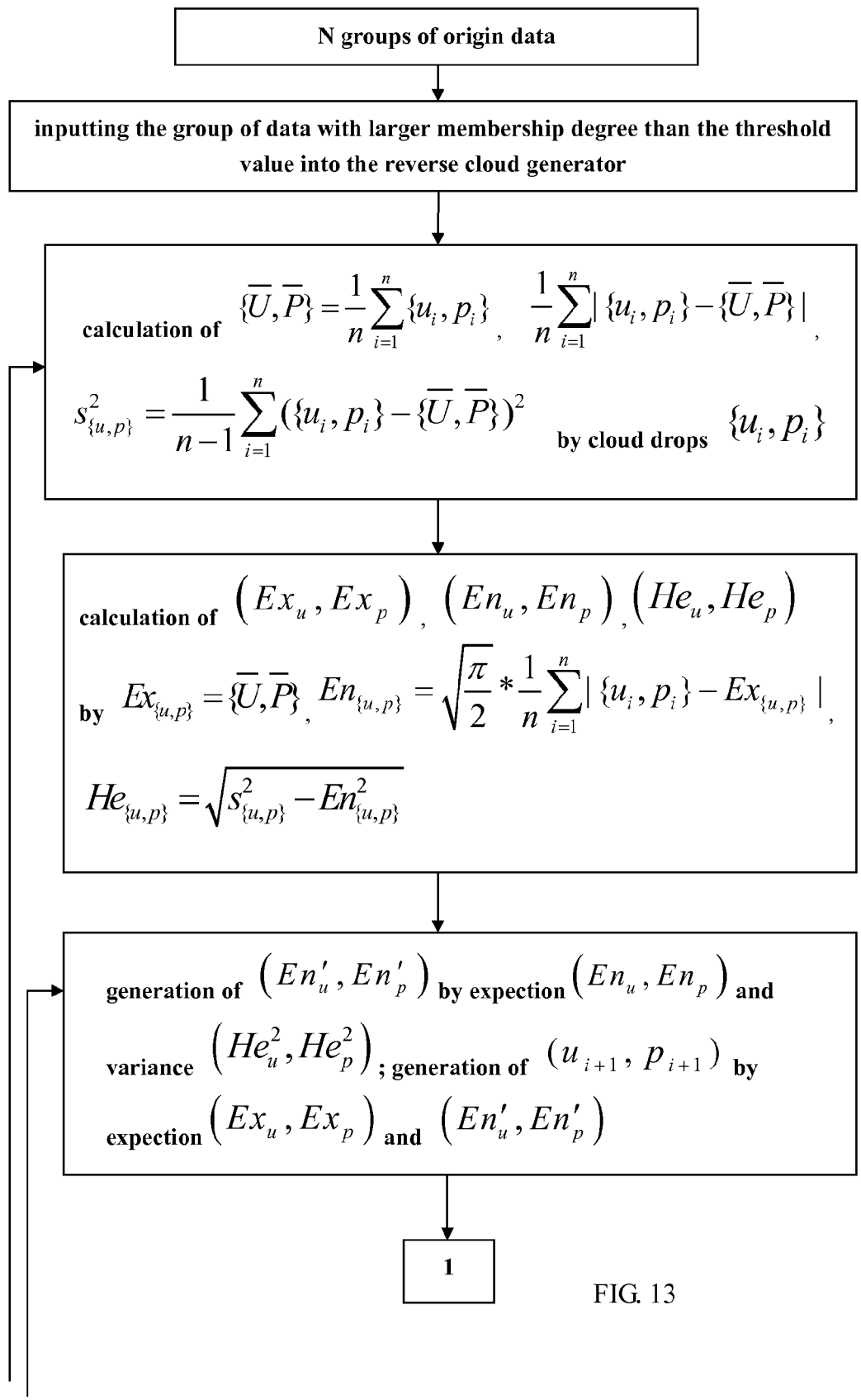
FIG. 13 is a flow chart showing the steps for the processing of the composite cloud generator according to the present invention.
Figure 13:
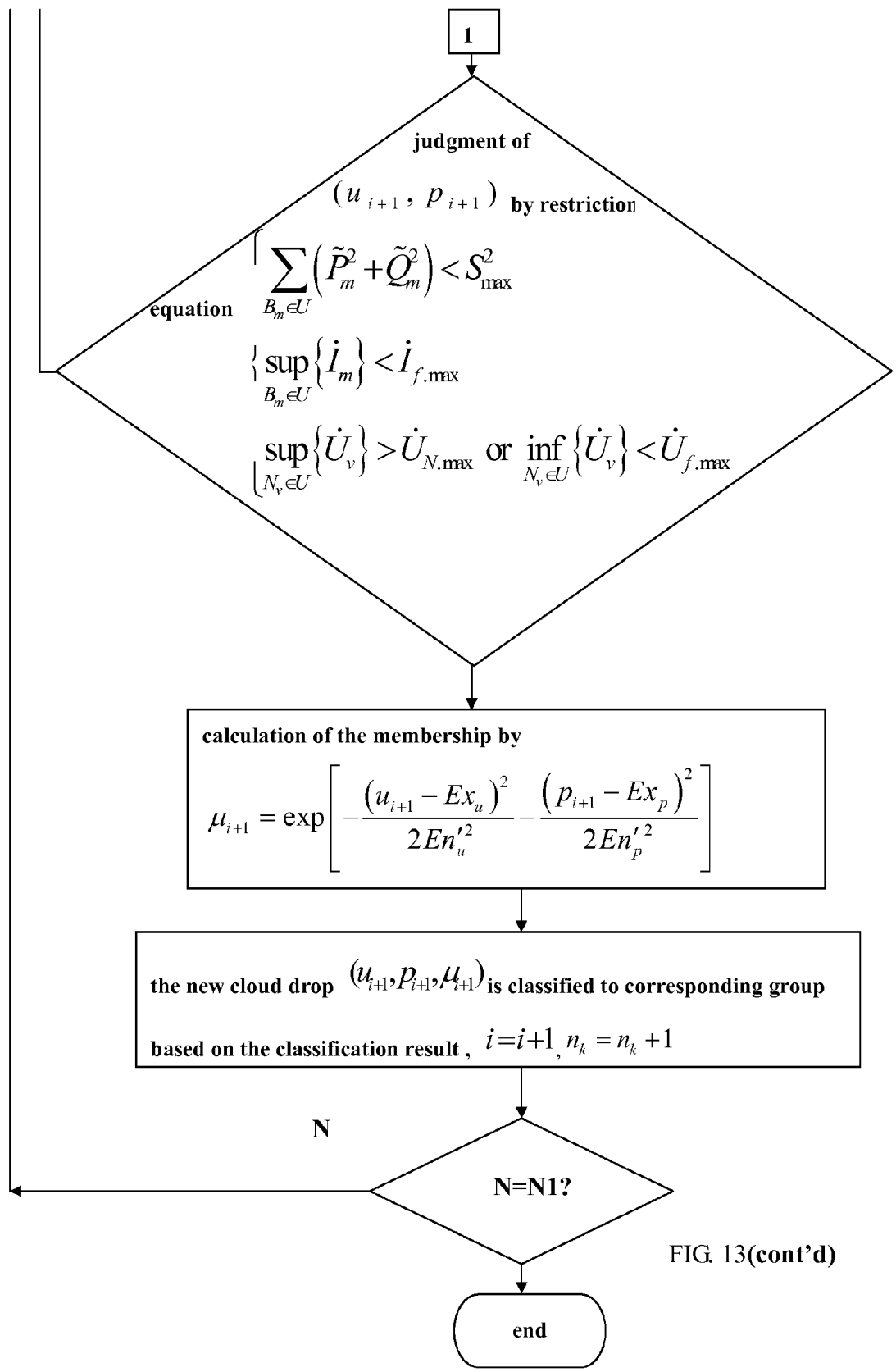
Figure 14:
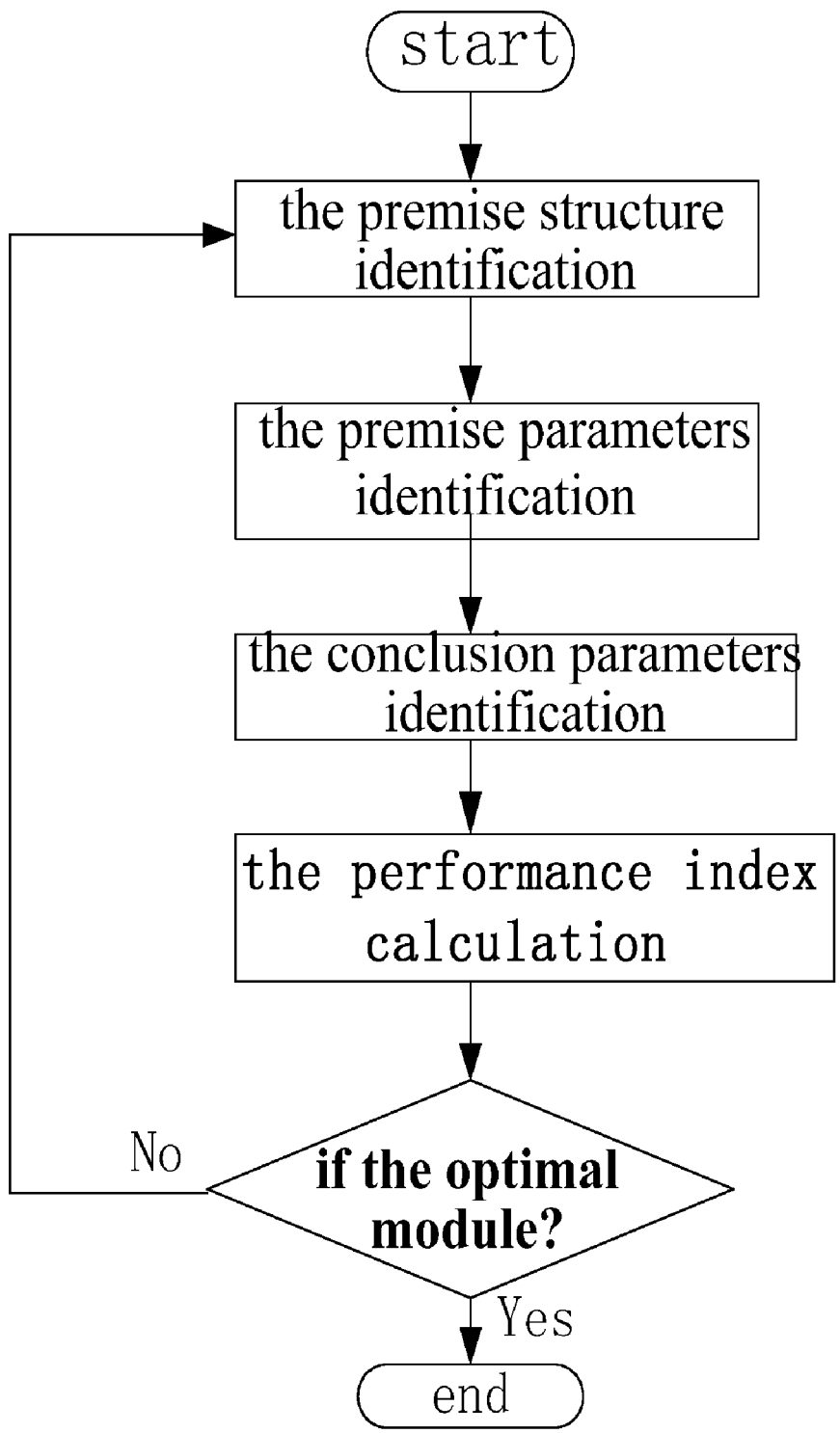
FIG. 14 is a flow chart showing the steps for identifying the fuzzy model according to the present invention.
Figure 15:
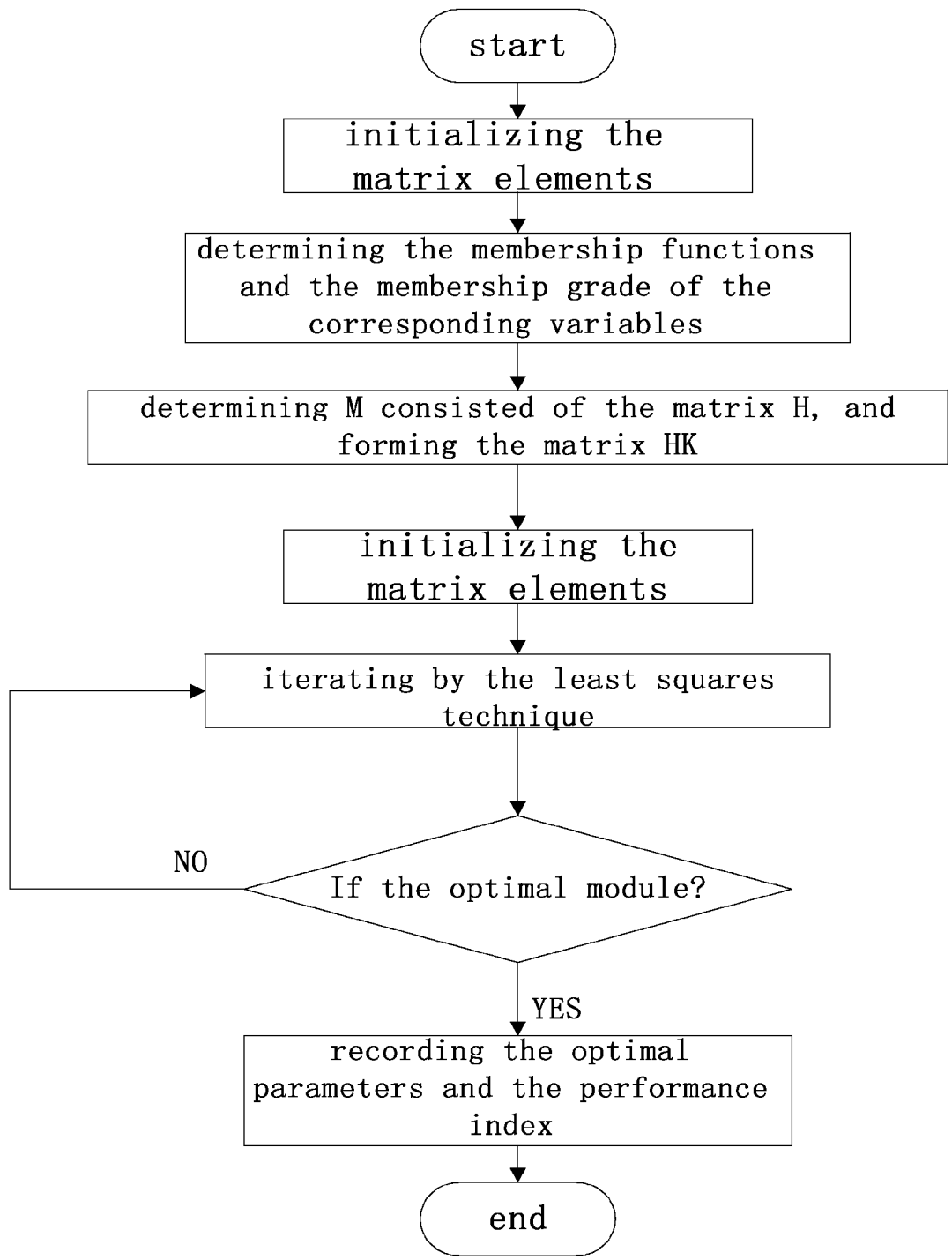
FIG. 15 is a flow chart showing the steps for identifying the conclusion parameters according to the present invention.
Figure 16:
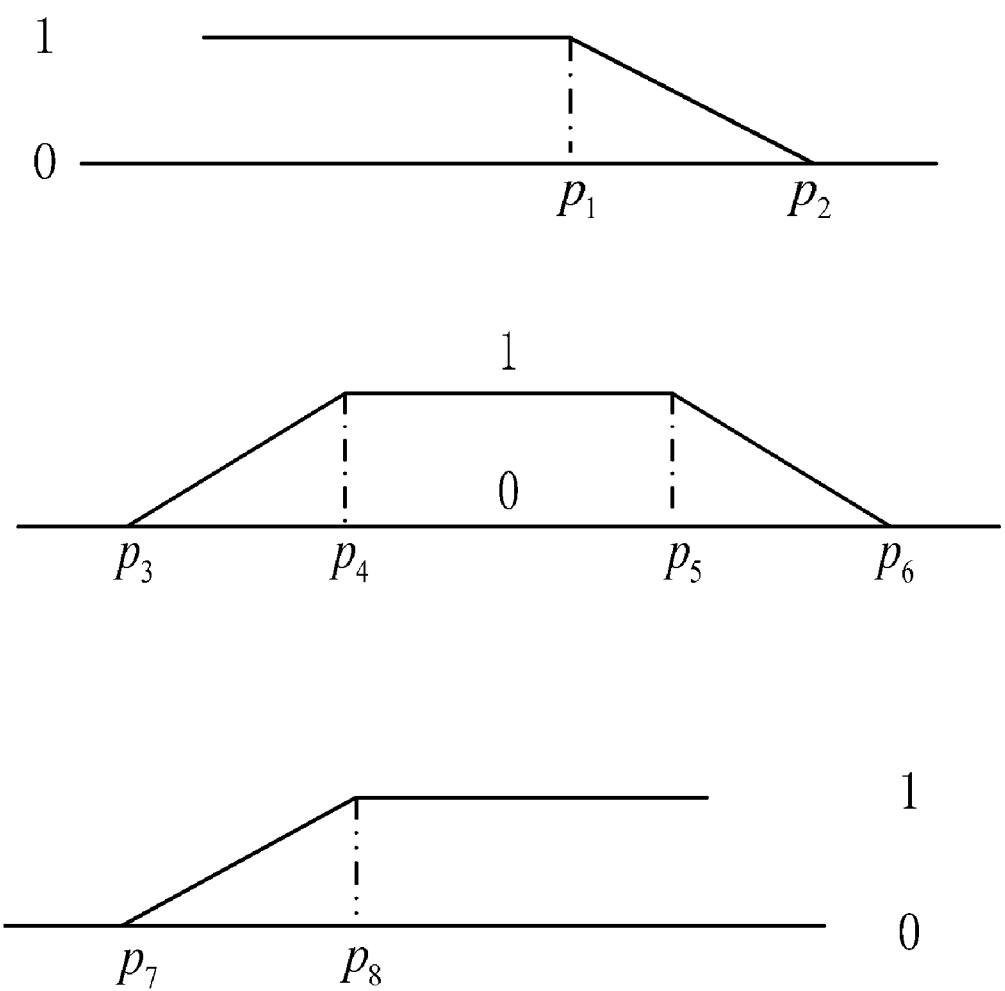
FIG. 16 is a graph showing the membership functions according to the present invention.
Figure 17:
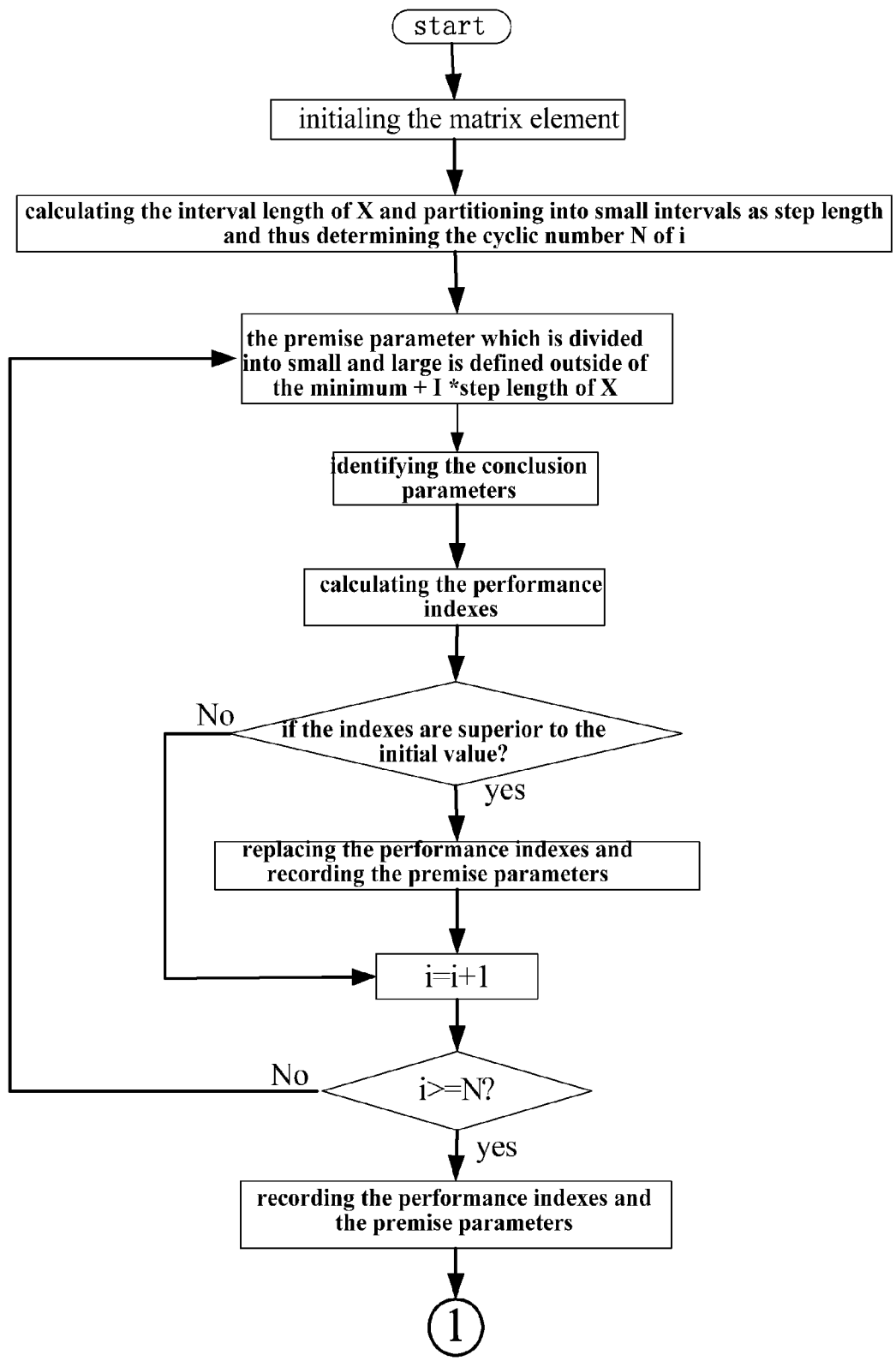
FIG. 17 is a flow chart showing the steps for identifying the premise parameter 1 according to the present invention.
Figure 17:
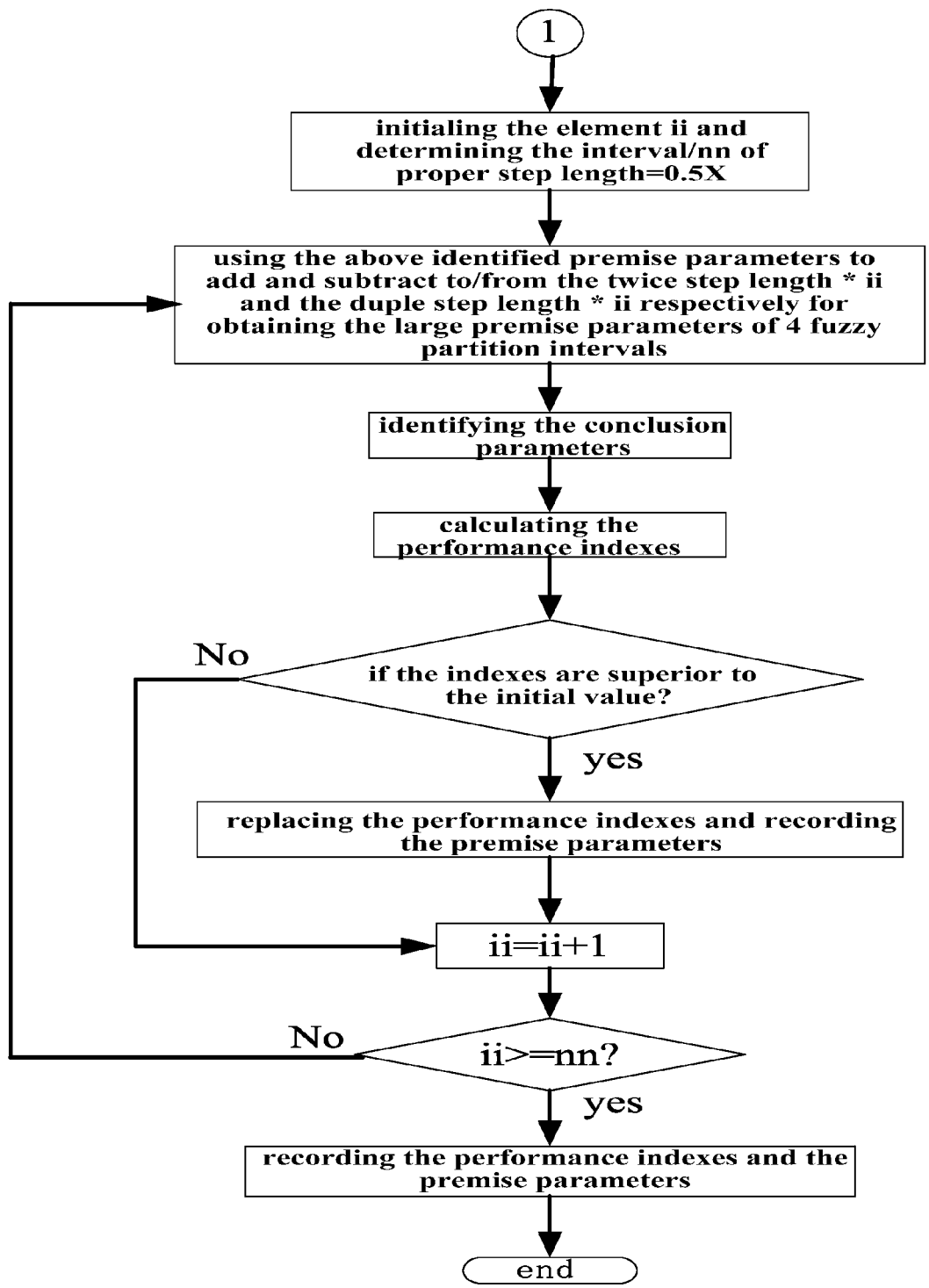
Figure 18:
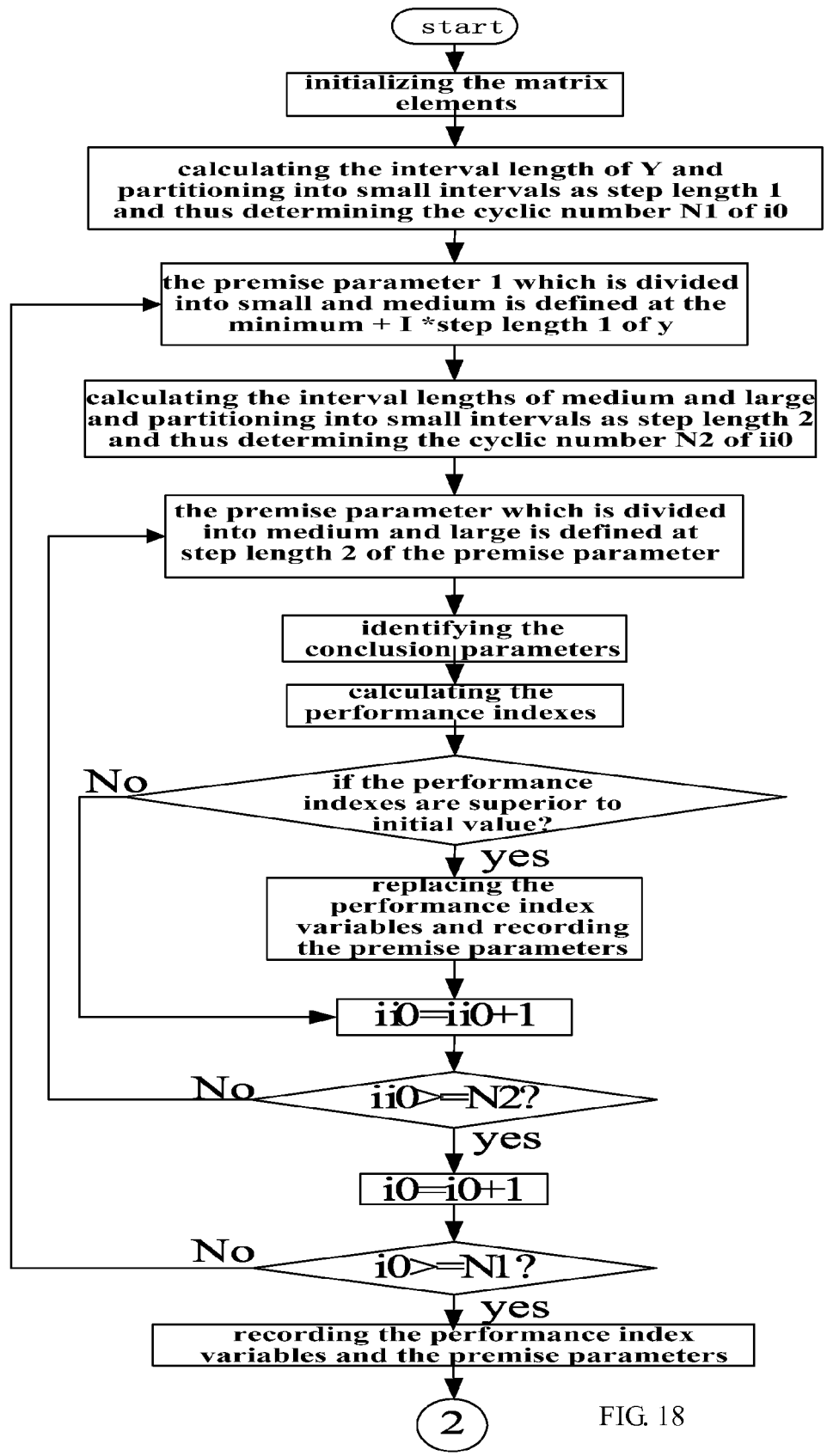
FIG. 18 is a flow chart showing the steps for identifying the premise parameter 2 according to the present invention.
Figure 18:
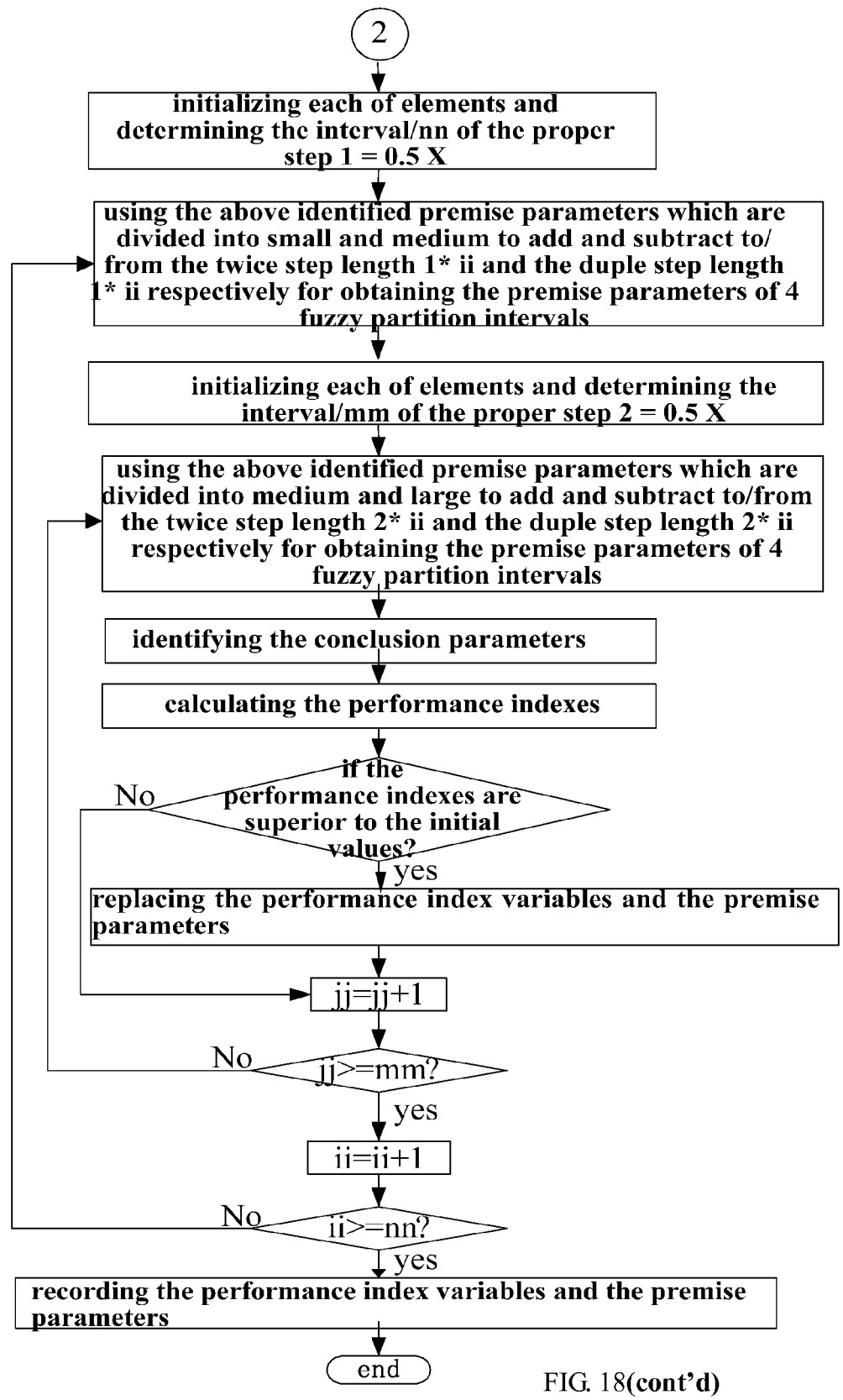
Figure 19:
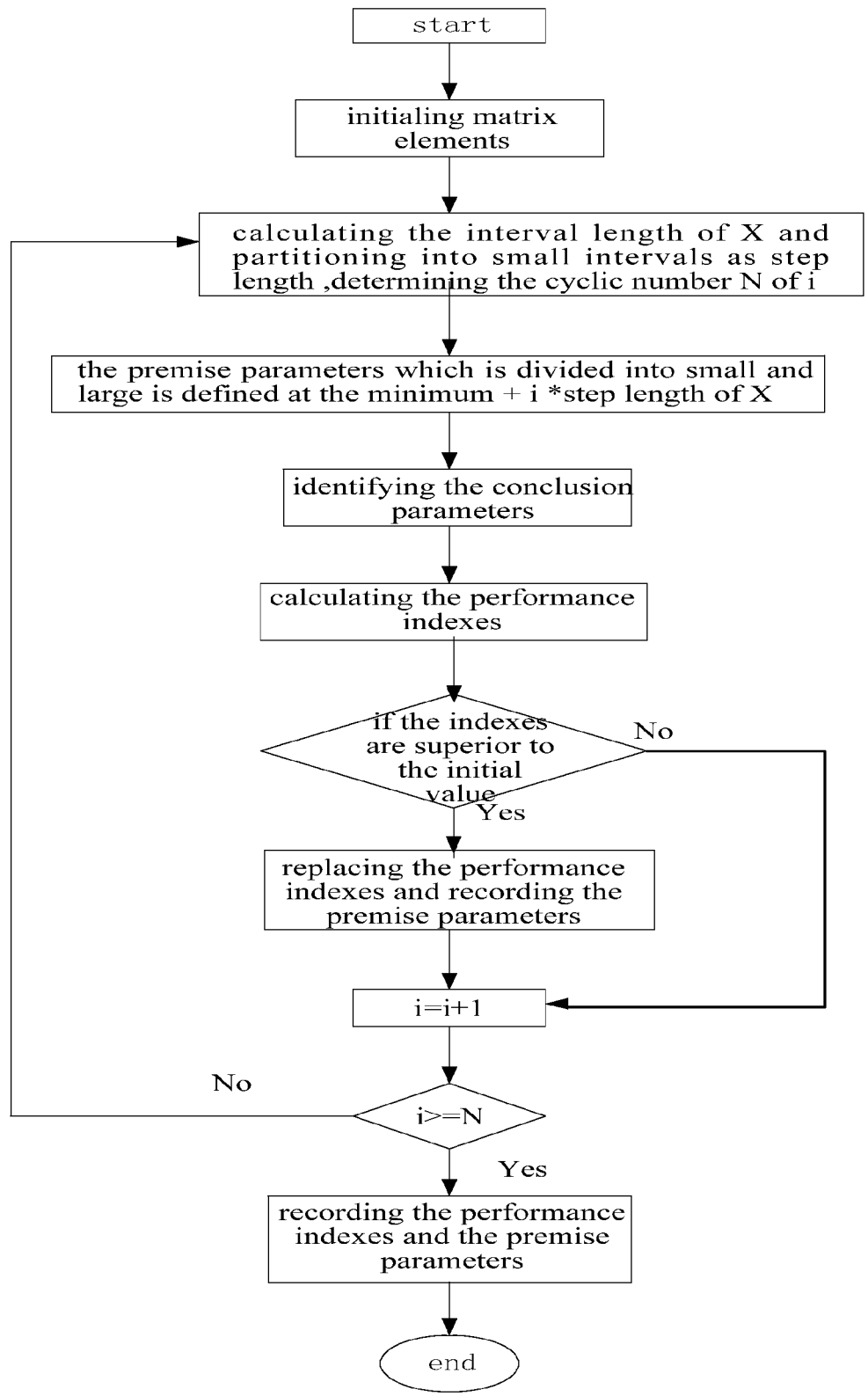
FIG. 19 is a flow chart showing the steps for the identification according to a second exemplary embodiment of the present invention.

The steps for the identification are shown in FIG. 19 (x represents the variable to be divided).

Figure 20:
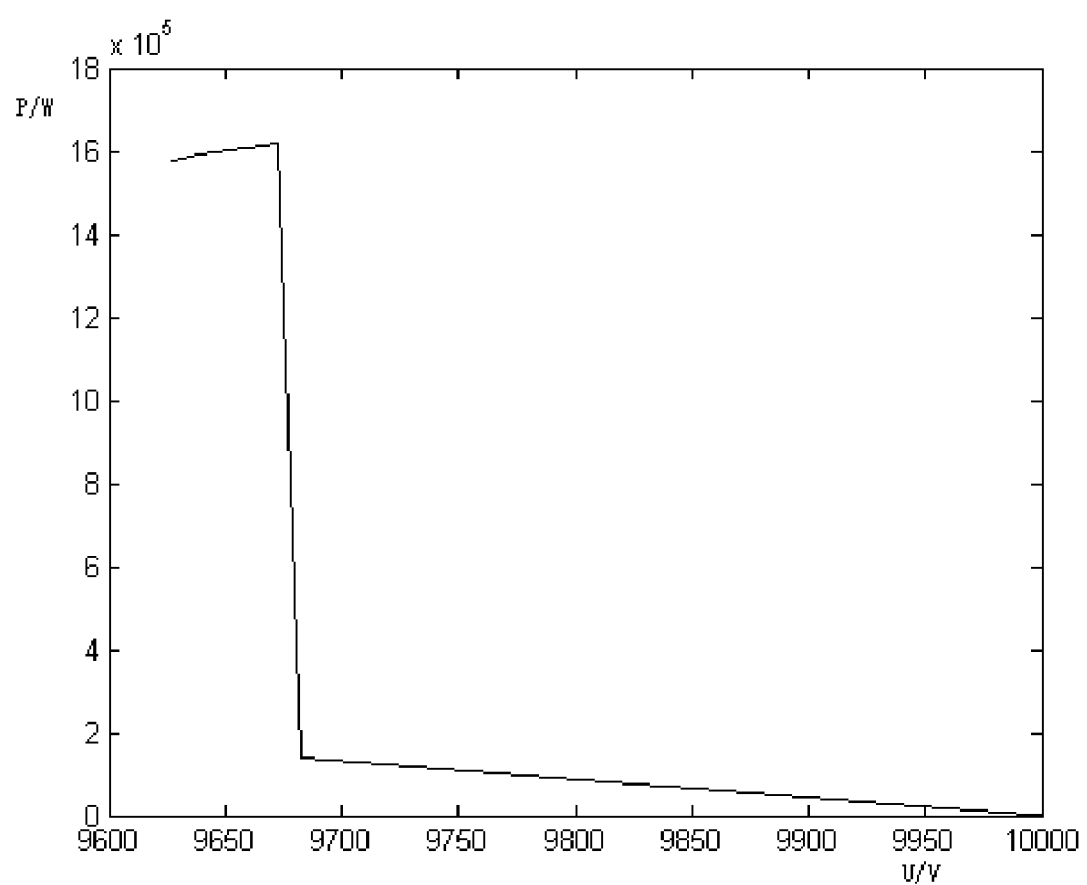
FIG. 20 is a graph showing the initial data according to a first exemplary embodiment of the present invention.
Figure 21:
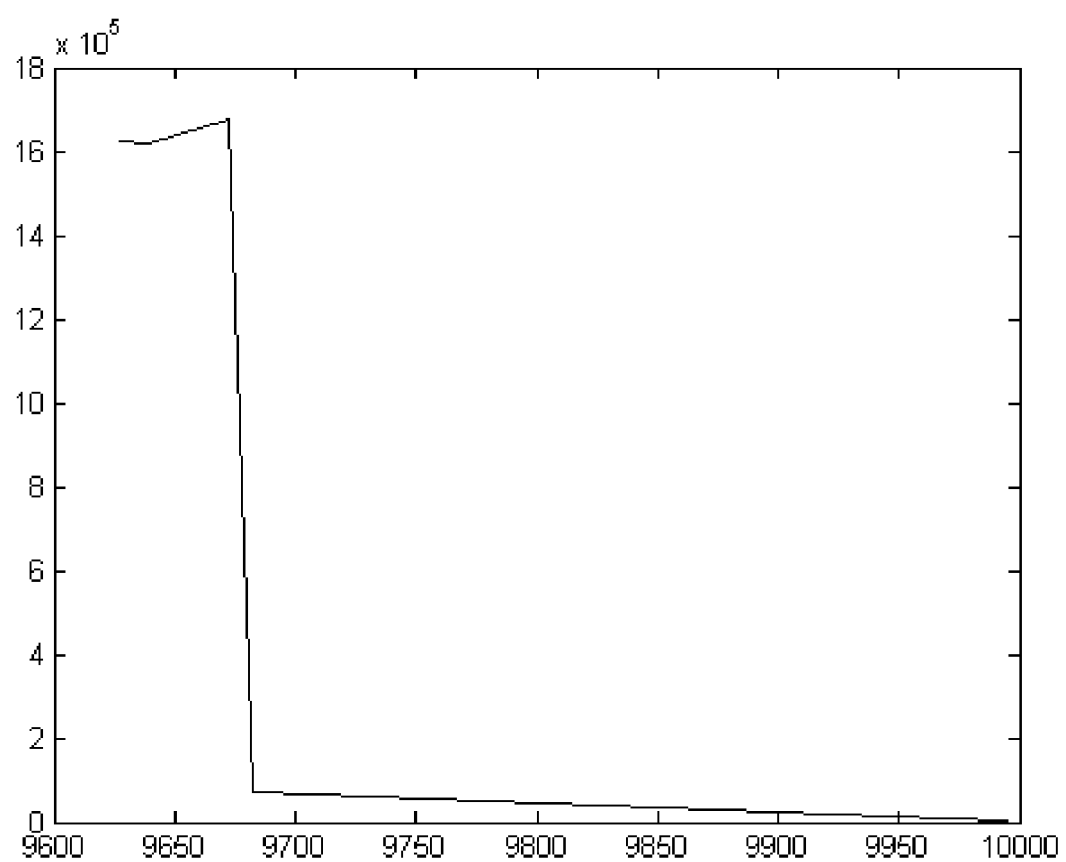
FIG. 21 is a graph showing the results of the T-S identification according to a first exemplary embodiment of the present invention.

FIG. 20 and FIG. 21 are graphs showing the initial data and the identification, respectively.

Example 2

Figure 22:
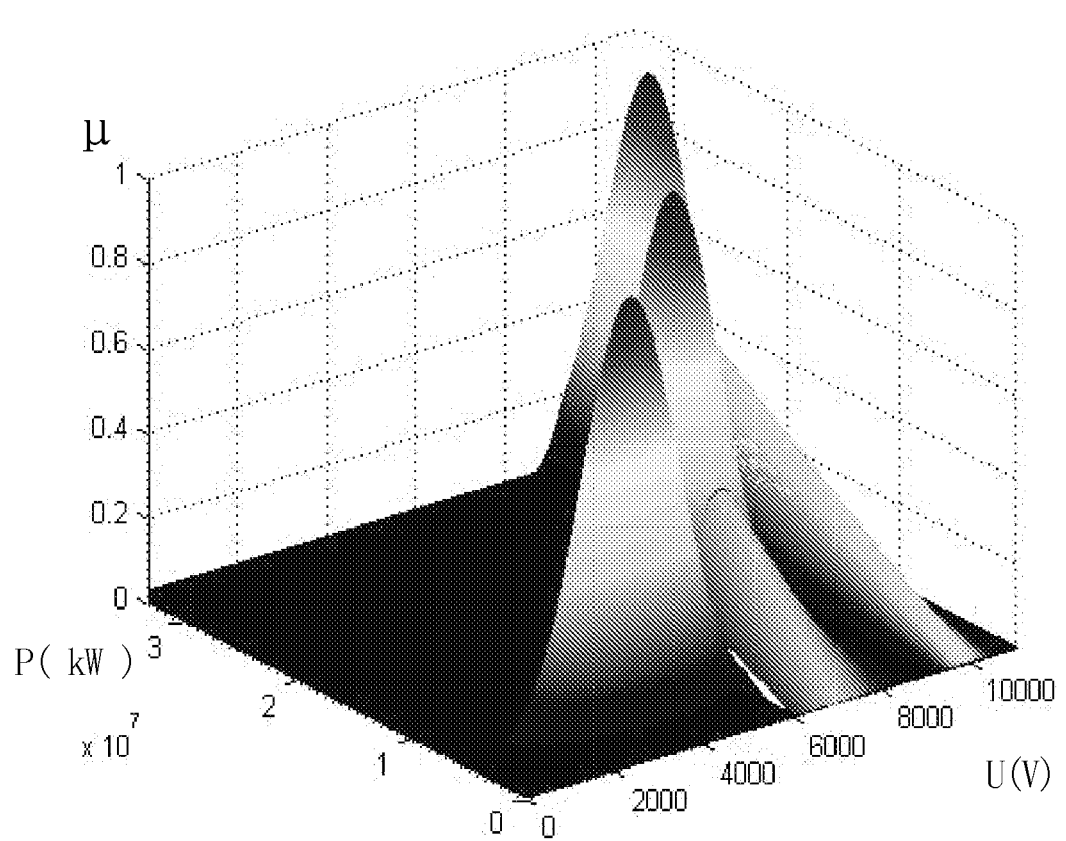
FIG. 22 is a graph showing the generated clouds according to a second exemplary embodiment of the present invention.

We take a part of 10KV power system in the Tongliao Grid for example. In the hardware circuit, 160 sets of data regarding to the peak and valley load fluctuation of the nodes in the normal and 40 sets of short-circuit fault data due to the two-phase short-circuit, three-phase short-circuit and the two-phase to-ground short circuit, etc. occurred between different nodes are collected from the power line. Through the power flow algorithm, the distributions of the active power and the reactive power and the voltage of the whole net are obtained according to 200 sets of data. 50 sets of data (30 sets of normal operation data and 20 sets of fault data) are referred as the basis data which constitute two types of basis two-dimensional data i.e. the two-dimensional data of the voltages of the nodes corresponding to the active power and the two-dimensional data of the voltages of the nodes corresponding to the reactive power. First, according to the distribution of data, the data is divided into large, medium and small fuzzy intervals as the inputs of composite cloud generator. And the data of each of fuzzy intervals is processed through the reverse cloud generator to generate the two-dimensional expectation, entropy, and super entropy, and then the cloud droplets are outputted from the cloud generator. Each of generated cloud droplets is examined by the constraint equations, which is qualified will be added into the initial fuzzy intervals, and then is inputted into reverse cloud generator again, so as to generate the two-dimensional expectation, entropy and super entropy, back and forth, until enough data is generated We took out the final data generated by the composite cloud generator to do the analysis, as shown in FIG. 22. 3 clouds represent the data distribution of the system subjected to the severe fault, to the minor fault and to the heavy load, respectively. It can be noted that when the system is subjected to the severe fault, the initial values are the least, and the difference from other situations is the biggest. It is found that there is almost no cross section between the clouds and another two clouds, and there is no incompleteness of the clouds due to the constraint conditions. The left part of the medium cloud is missed due to the constraint conditions of the relay protection for the start, the below extra part is due to the edge regional load rejection of the system. Above the right side of the cloud, there is a missed part due to the limitation of the maximum current capacity of the system, and there is an extra part indicates the cases of special system operating with light load and no-load. Referring to FIG. 22, the generator based on the composite cloud modes reflects the true nature of the load well.

Figure 23:
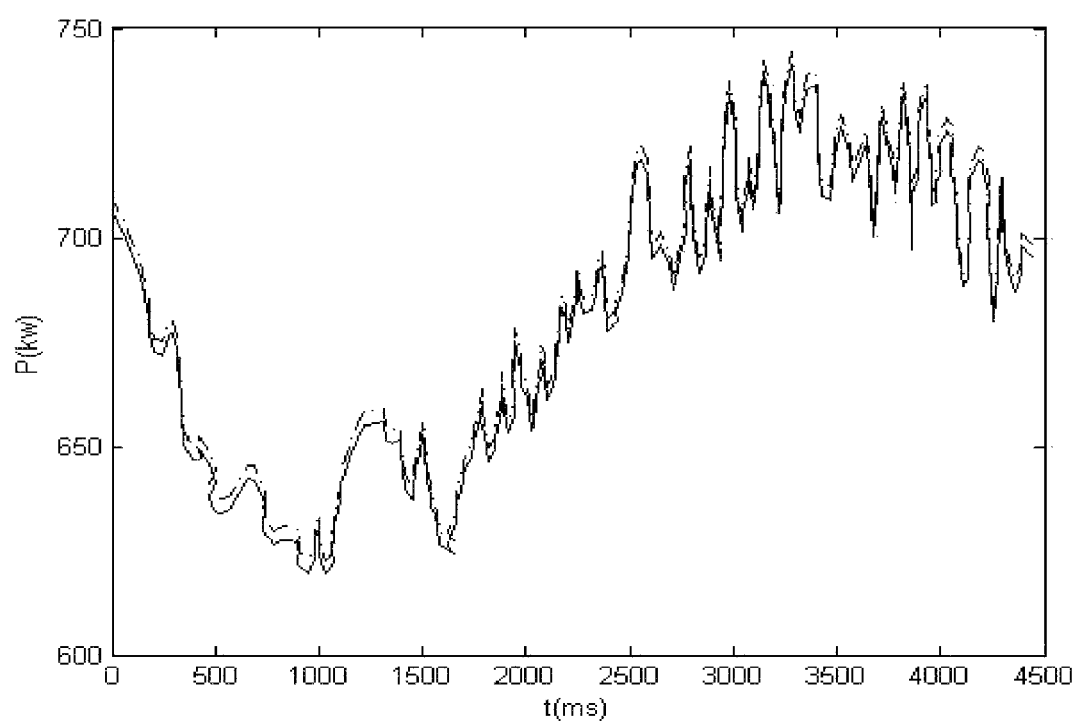
FIG. 23 is a graph showing the results of the improved T-S fuzzy mode identification.

We took out the final data of the nodes generated by the composite cloud generator in the case of the certain practical fault to implement the fuzzy identification. According to the method, the premise structures which are set by the program in advance are implemented the identification, and then the conclusion parameters are implemented the identification, thus, the results of the identifications are applied to the PER calculations. The smallest PER is selected to be the conclusion structure and the premise parameters and the conclusion parameters are recorded. FIG. 23 is a graph showing the identification of T-S fuzzy model, where the real line is the practical measurement curve, the dotted line is the identification curve used in the method according to the present invention. It is easy to see that the result of fuzzy T-S model based on cloud data is more accurate than others.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A load fuzzy modeling device for a power system based on a causality diagram, a composite cloud generator and an improved T-S fuzzy model, comprising:
   a hardware device including the upper and lower devices, which includes sensors, a signal conditioning and filter module, an A/D conversion module, a causality conversion module, a DSP module, a memory module, a display and keyboard module, and a communication module, wherein
   the sensors, the signal conditioning and filter module, the A/D conversion module, the causality conversion module, the DSP module, the memory module, the display and keyboard module and the communication module are connected with the DSP module respectively, and the upper device is connected with the commutation module;
   a voltage and a current are respectively acquired from the system through a voltage transformer and a current transformer, and then transmitted into the filter circuit for filtering, thus amplified through a amplifier LM258P as the voltage within the range of −5V~+5V so as to input into the A/D conversion modules for sampling;
   a digital signal simply processed by the causality conversion module according to certain analysis algorithm principle, and the processed signal transmitted into the DSP to process, the final results thus displayed on the LCD screen and transmitted into the PC through the commutation module.

2. The load fuzzy modeling device according to claim 1, wherein the voltage transformer chooses PT204A, and the current transformer chooses CT254A, the voltage and the current respectively are acquired from the system through the voltage transformer and the current transformer, respectively, and then the signals from the voltage transformer and the current transformer are transmitted into the filter circuit for filtering, and amplified by a amplifier LM258P as the voltage within the range of −5V~+5V so as to be inputted into the DSP modules for sampling, J3 connected with the current transformer and with the voltage transformer, and J4 connected with the A/D conversion module, and the high-voltage part is also able to be isolated from the system in the circuit for protection;
   the A/D conversion module chooses the chip MAX125, where the channels of the pins 1, 2, 3, 4, 33, 34 are used to output the signals from the port J4, and the data ports thereof are directly connected with the data ports of the causality conversion chip, and the three-phase voltage and current from the signal conditioning module sampled for applying the basic data for the system calculation;

the causality conversion module chooses the chip EMP7128 which uses the CMOS technique and based on the second generation matrix structure, actually is a device depending on the E2PROM, and EMP7128SLC84-15 compositing of 84 pins of which 5 pins are applied to the ISP (In System Programmable) download, which is system programmed easily, in the device, there are 6000 integrated gates of which 2,500 are typically available gates, 128 logic elements, 60 I/Os which are separately configured to be the input, output and two-way mode, 2 global clocks and one global enable and one global clear, these gate circuits are thus programmed by software Max+Plus II, EMP7128SLC84-15 supporting the multi-voltage operation, where the transmission of delay is 7.5 ns, and the highest frequency is up to 125 MHZ, and also supporting various programming methods, thereby, it is convenient for the third generation software Max+Plus II of the Alter company to simulate, synthesize and download the device, the input port thereof connected with the data port of the A/D conversion, and thus the output signal directly inputted into the data port of the DSP;

the memory module chooses the chip X5043, and the pins 4, 3, 2, 1 thereof connected with the pins 28, 29, 32, 33 of the DSP chip, respectively, and then the voltage of each phase, the current, the active power and the power factor of 64 days on the hour also stored in the data memory in addition to the various parameters settled by the memory system, in addition, the back-up battery of the memory ensures that the data will not be lost under the condition of insufficient power supplies;

the reset circuit of the DSP chip chooses the chip TL7705A, and the pin 5 thereof is connected with the pin reset;

the display and keyboard modules are applied to several man-machine dialog operations, e.g. setting the parameters of the device and monitoring the operation condition of the device, thus such function in the hardware design is realized by setting the keys;

the communication module further compositing of the function of communicating with the higher-level module for the requirements on the unattended operation and the comprehensive automatic station, and the serial port thereof only providing the hardware structure and basic communication operation for the mutual channel, the computer serial interface using the Protocol RS232, the pin 11, 12 of MAX232 connected with the pins 25, 26 of the DSP chip, Socket 232 connected with the PC serial port through the cable 232.

3. A method implemented in the load fuzzy modeling device for the power system based on the causality diagram, the composite cloud generator and the improved T-S fuzzy model according to claim 1, wherein the causality conversion is applied to the process of the fuzzy modeling data, the method comprising:

Step 1: inputting the initial knowledge base Y;
Step 2: selecting the attribute $A_i$ from the attribute list as the classification attribute;
Step 3: judging if the number of the values of the attribute $A_i$ are $k_i$, Y is divided into $k_i$ subsets $T_1, \ldots, Tk_i$, where, $T_{ij}=\{<x,C>|<x,c>\}\epsilon T$, and then the attribute value of X is $k_i$;
Step 4: deleting the attribute $A_i$ from the attribute list;
Step 5: for every $T_{ij}\{1\leq j\leq K_1\}$, given $T=T_{ij}$;
Step 6: if the attribute list is not empty, returning to step 1, or outputting.

4. A method implemented in the load fuzzy modeling device for the power system based on the causality diagram, the composite cloud generator and the improved T-S fuzzy model according to claim 1, wherein the data completion method based on the composite cloud generator is combined with the fuzzy modeling, the method comprising:

Step 1: partitioning N groups of initial data into fuzzy intervals by using the T-S fuzzy identification method, and make the fuzzy interval information as the input;
Step 2: according to the results of the partitioning, grouping all the data of which the membership degrees larger than the threshold value, and then are inputted into the two-dimensional reverse cloud generator;
Step 3: according to the vector $\{u_i,p_i\}$ of the cloud droplets, the mean of each group of the sampled data is $$\{\overline{U}, \overline{P}\} = \frac{1}{n}\sum_{i=1}^{n}\{u_i, p_i\},$$

respectively, the absolute central moment of the first-order two-dimensional sample is $$\frac{1}{n}\sum_{i=1}^{n}|\{u_i, p_i\} - \{\overline{U}, \overline{P}\}|$$

respectively, and the empiric variance is $$s_{\{u,p\}}^2 = \frac{1}{n-1}\sum_{i=1}^{n}(\{u_i, p_i\} - \{\overline{U}, \overline{P}\})^2,$$

respectively;
Step 4: $Ex_{(u,p)}=\{\overline{U},\overline{P}\}$ the obtained expectation is ($Ex_u$, $Ex_p$);
Step 5:

$$En_{\{u,p\}} = \sqrt{\frac{\pi}{2}} * \frac{1}{n}\sum_{i=1}^{n}|\{u_i, p_i\} - Ex_{\{u,p\}}|,$$

and entropy ($En_u$, $En_p$);
Step 6: $He_{(u,p)}=\sqrt{s_{(u,p)}^2-En_{(u,p)}^2}$, the obtained super entropy is ($He_u$, $He_p$);
Step 7: generating a two-dimensional normal random number ($En'_u$, $En'_p$) with the expectation ($En_u$, $En_p$) and the variance ($He_u^2$, $He_p^2$);
Step 8: generating a two-dimensional normal random number ($u_{i+1}$, $p_{i+1}$) with the expectation ($Ex_u$, $Ex_p$) and the variance ($En'_u$, $En'_p$);
Step 9: whether the two dimensional normal random number ($u_{i+1}$, $p_{i+1}$) according to constraint conditions or not, if yes, proceed to step 10, or abandon the number then proceed to step 7;

Step 10: calculating the membership degrees $$\mu_{i+1} = \exp\left[-\frac{(u_{i+1} - Ex_u)^2}{2En_u'^2} - \frac{(p_{i+1} - Ex_p)^2}{2En_p'^2}\right]$$

of different groups of the two-dimensional normal clouds for the cloud droplets, respectively;

Step 11: Given one of the cloud droplets in the numeric field ($u_{i+1}, p_{i+1}, \mu_{i+1}$) which is a specific numerical realization of the language value represented by the cloud in the universe, where, ($u_{i+1}, p_{i+1}$) represents the corresponding numerical of the qualitative in the universe, and $\mu_{i+1}$ represents a measure of the degree of ($u_{i+1}, p_{i+1}$) that belongs to this language value;

Step 12: according to the partitioning results from step 2, adding the new generated cloud droplets ($u_{i+1}, p_{i+1}, \mu_{i+1}$) into the cloud droplets correspondingly grouped, and i=i+1, $n_k=n_k+1$;

Step 13: repeating step 3 to 12, until the required N1 cloud droplets have been generated; and Step 14: according to the characteristics of the system, using the generated N1 cloud droplets which are not covered to construct the manual cloud rule.

5. A method implemented in the load fuzzy modeling device for the power system based on the causality diagram, the composite cloud generator and the improved T-S fuzzy model according to claim 1, wherein using the improved T-S fuzzy identification method, the identification processes of the premise parameters are the same, the method for one of processes comprising:

the identification of the premise parameter 1:
Step 1: starting;
Step 2: initialing the matrix element;
Step 3: calculating the interval length of X and partitioning into small intervals as step length and thus determining the cyclic number N of i;
Step 4: defining the premise parameter which is divided into small and large outside of the minimum+i*step length of X;
Step 5: identifying the conclusion parameters;
Step 6: calculating the performance indexes;
Step 7: judging if the indexes are superior to the initial value, proceeding to step 8, or to step 9;
Step 8: replacing the performance indexes and recording the premise parameters;
Step 9: i=i−1;
Step 10: if i>=N, proceed to step 11, or to step 4;
Step 11: recording the performance indexes and the premise parameters;
Step 12: initialing the element ii and determining the interval/nn of proper step length=0.5×;
Step 13: using the above identified premise parameters to add and subtract to/from the twice step length*ii and the duple step length*ii respectively for obtaining the large premise parameters of 4 fuzzy partition intervals;
Step 14: identifying the conclusion parameters;
Step 15: calculating the performance indexes;
Step 16: if the indexes are superior to the initial value, proceed to step 17, or to step 18;
Step 17: replacing the performance indexes and recording the premise parameters;
Step 18: ii=ii+1;
Step 19: if ii>nn, proceed to step 20, or to step 13;
Step 20: recording the performance indexes and the premise parameters; and
Step 21: ended;

then the identification of the premise parameter 2:
Step 1: start;
Step 2: initializing the matrix elements;
Step 3: calculating the interval length of Y and partitioning into small intervals as step length 1 and thus determining the cyclic number N1 of i0;
Step 4: the premise parameter 1 which is divided into small and medium is defined at the minimum+I 0*step length 1 of y;
Step 5: calculating the interval lengths of medium and large and partitioning into small intervals as step length 2 and thus determining the cyclic number N2 of ii0;
Step 6: the premise parameter which is divided into medium and large is defined at step length 2 of the premise parameter;
Step 7: identifying the conclusion parameters;
Step 8: calculating the performance indexes;
Step 9: if the performance indexes are superior to initial value, proceed to step 10, or to step 11;
Step 10: replacing the performance index variables and recording the premise parameters;
Step 11: ii0=ii0+1;
Step 12: if ii0>=N2, proceed to step 13, or to step 6;
Step 13: i0=i0+1;
Step 14: if i0>=N1, proceed to step 15, or to step 4;
Step 15: recording the performance index variables and the premise parameters;
Step 16: initializing each of elements and determining the interval/nn of the proper step 1=0.5×;
Step 17: using the above identified premise parameters which are divided into small and medium to add and subtract to/from the twice step length 1\*ii and the duple step length 1\*ii respectively for obtaining the premise parameters of 4 fuzzy partition intervals;
Step 18: initializing each of elements and determining the interval/mm of the proper step 2=0.5×;
Step 19: using the above identified premise parameters which are divided into medium and large to add and subtract to/from the twice step length 2\*jj\*and the duple step length 2\*jj\*respectively for obtaining the premise parameters of 4 fuzzy partition intervals;
Step 20: identifying the conclusion parameters;
Step 21: calculating the performance indexes;
Step 22: if the performance indexes are superior to the initial values, proceed to step 23, or to step 24;
Step 23: replacing the performance index variables and the premise parameters;
Step 24: jj=jj+1;
Step 25: If jj>=mm, proceed to step 26, or to step 19;
Step 26: ii=ii+1;
Step 27: if ii>=nn, proceed to step 28, or to step 17;
Step 28: recording the performance index variables and the premise parameters; and
Step 29: ended.

\* \* \* \* \*